United States Patent
Fu et al.

(10) Patent No.: US 11,647,346 B2
(45) Date of Patent: *May 9, 2023

(54) HEARING AID DEVICES

(71) Applicant: SHENZHEN SHOKZ CO., LTD., Guangdong (CN)

(72) Inventors: Junjiang Fu, Shenzhen (CN); Huifang Tang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,547

(22) Filed: Jun. 24, 2022

(65) Prior Publication Data

US 2022/0329955 A1    Oct. 13, 2022

Related U.S. Application Data

(63) Continuation of application No. 17/649,357, filed on Jan. 29, 2022, now Pat. No. 11,405,734, which is a
(Continued)

(51) Int. Cl.
*H04R 25/00* (2006.01)

(52) U.S. Cl.
CPC .......... *H04R 25/604* (2013.01); *H04R 25/65* (2013.01); *H04R 2225/43* (2013.01); *H04R 2460/13* (2013.01)

(58) Field of Classification Search
CPC .... H04R 1/1016; H04R 1/44; H04R 2420/07; H04R 1/02; H04R 1/26; H04R 1/1075;
(Continued)

(56) References Cited

U.S. PATENT DOCUMENTS 10,721,572 B2    7/2020    Petersen et al.
2011/0150262 A1*  6/2011    Nakama .............. H04R 1/1008
                                                    381/370
2017/0064464 A1    3/2017    Rosenkranz et al.

FOREIGN PATENT DOCUMENTS

CN    111954142 A    11/2020
CN    112118339 A    12/2020

OTHER PUBLICATIONS

International Search Report in PCT/CN2021/076603 dated Oct. 26, 2021, 8 pages.
(Continued)

*Primary Examiner* — Amir H Etesam
(74) *Attorney, Agent, or Firm* — Metis IP LLC

(57) ABSTRACT

The present disclosure discloses a hearing aid device. The hearing aid device may comprise at least one sound transmitter configured to collect a sound signal and convert the sound signal into an electrical signal, a signal processing circuit configured to generate a control signal by processing the electrical signal, at least one vibration loudspeaker configured to convert the control signal into a vibration signal, and a housing structure configured to accommodate at least one of the at least one sound transmitter, the signal processing circuit, or the at least one vibration loudspeaker, wherein the control signal may include an original signal and an air-conducted sound leakage signal generated from the at least one vibration loudspeaker, and a difference between the air-conducted sound leakage signal received by the at least one sound transmitter and the original signal may not be larger than −33 dB.

20 Claims, 14 Drawing Sheets

Related U.S. Application Data continuation of application No. PCT/CN2021/076603, filed on Feb. 10, 2021.

(58) Field of Classification Search
CPC ............... H04R 1/1091; H04R 1/1041; H04R 2460/13; H04R 1/1066; H04R 1/105
See application file for complete search history.

(56) References Cited

OTHER PUBLICATIONS

Written Opinion in PCT/CN2021/076603 dated Oct. 26, 2021, 6 pages.

\* cited by examiner

500

HEARING AID DEVICES

CROSS-REFERENCE TO RELATED APPLICATIONS

This application is a continuation of U.S. application Ser. No. 17/649,357, filed on Jan. 29, 2022, which is a Continuation of International Patent Application No. PCT/CN2021/076603, filed on Feb. 10, 2021, the entire contents of which are incorporated herein by reference.

TECHNICAL FIELD

The present disclosure generally relates to the field of acoustics, and in particular, to a hearing aid device.

BACKGROUND

Existing hearing aid devices are usually small loudspeakers. The small loudspeakers amplify the sound that a user cannot hear originally, and send the amplified sound to the auditory center of the brain of the user according to a residual hearing of the user. However, for users with impaired hearing or degraded hearing, traditional sound transmission manners in ear canals are not ideal for improving the hearing effect. Bone-conducted sound transmission manner may break through the traditional sound transmission manners in the ear canals and improve the hearing effect of the user effectively. However, some hearing aid devices using bone-conducted sound transmission manner may generate howling.

Therefore, it is desirable to provide hearing aid devices to improve the hearing effect of the users, so that the users may receive clearer and more stable sounds.

SUMMARY

The present disclosure provides a hearing aid device. The hearing aid device may include at least one sound transmitter configured to collect a sound signal and convert the sound signal into an electrical signal, a signal processing circuit configured to generate a control signal by processing the electrical signal, at least one vibration loudspeaker configured to convert the control signal into a vibration signal, and a housing structure configured to accommodate at least one of the at least one sound transmitter, the signal processing circuit, or the at least one vibration loudspeaker, wherein the control signal may include an original signal and an air-conducted sound leakage signal generated from the at least one vibration loudspeaker, and a difference between the air-conducted sound leakage signal received by the at least one sound transmitter and the original signal may not be larger than −33 dB.

In some embodiments, in a frequency range of 100 Hz-2000 Hz, the difference between the air-conducted sound leakage signal received by the at least one sound transmitter from the at least one vibration loudspeaker and the original signal may not be larger than −40 dB.

In some embodiments, in a frequency range of 100 Hz-2000 Hz, the difference between the air-conducted sound leakage signal received by the at least one sound transmitter from the at least one vibration loudspeaker and the original signal may not be larger than −45 dB.

In some embodiments, in a frequency range of 2000 Hz-8000 Hz, the difference between the air-conducted sound leakage signal received by the at least one sound transmitter from the at least one vibration loudspeaker and the original signal may not be larger than −33 dB.

In some embodiments, in a frequency range of 2000 Hz-8000 Hz, the difference between the air-conducted sound leakage signal received by the at least one sound transmitter from the at least one vibration loudspeaker and the original signal may not be larger than −38 dB.

In some embodiments, a distance between any one of the at least one sound transmitter and any one of the at least one vibration loudspeaker may not be less than 7 mm.

In some embodiments, a distance between any one of the at least one sound transmitter and any one of the at least one vibration loudspeaker may not be less than 20 mm.

In some embodiments, a distance between any one of the at least one sound transmitter and any one of the at least one vibration loudspeaker may not be less than 36 mm.

In some embodiments, a distance between any one of the at least one sound transmitter and any one of the at least one vibration loudspeaker may not be less than 45 mm.

In some embodiments, the at least one sound transmitter and the at least one vibration loudspeaker may be arranged on the same side or different sides of an auricle of a user.

In some embodiments, a baffle structure may be arranged between the at least one sound transmitter and the at least one vibration loudspeaker, and the baffle structure may be connected to the housing structure.

In some embodiments, the vibration loudspeaker may include a first housing structure connected to the housing structure, the first housing structure may include at least one hole, and the at least one hole may be in communication with an inside of the first housing structure.

In some embodiments, the at least one hole may be arranged on a bottom sidewall of the first housing structure of the at least one vibration loudspeaker. The bottom sidewall may face the at least one sound transmitter and the at least one vibration loudspeaker.

In some embodiments, the at least one hole may be arranged on a sidewall of the first housing structure of the at least one vibration loudspeaker. The sidewall may face away from the at least one sound transmitter.

In some embodiments, the at least one hole may be arranged on a bottom side wall of the first housing structure of the at least one vibration loudspeaker.

In some embodiments, the at least one hole may be arranged on a sidewall of the first housing structure of the at least one vibration loudspeaker. The sidewall may face the at least one sound transmitter.

In some embodiments, a mesh structure may be arranged on the at least one hole, and the mesh structure may cover the at least one hole.

In some embodiments, an acoustic impedance of the mesh structure may not be larger than 260 MKS Rayls.

In some embodiments, an acoustic impedance of the mesh structure may not be larger than 160 MKS Rayls.

In some embodiments, an acoustic impedance of the mesh structure may not be larger than 145 MKS Rayls.

In some embodiments, an acoustic impedance of the mesh structure may not be larger than 75 MKS Rayls.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
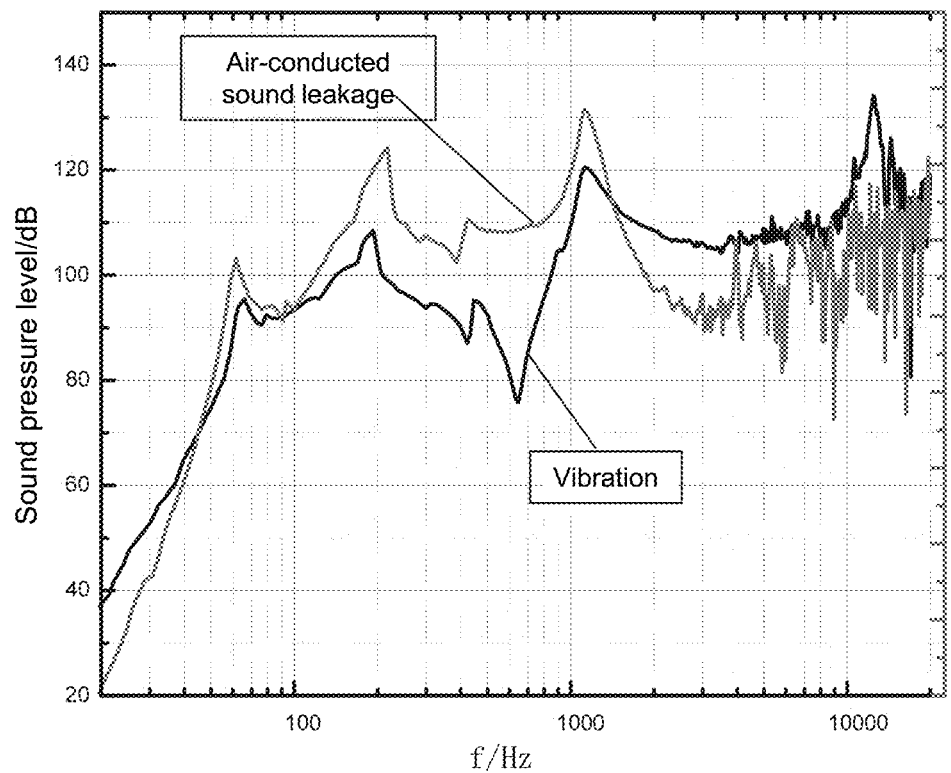
FIG. 1 illustrates a frequency response curve of a vibration signal and a frequency response curve of an air-conducted sound leakage signal of an exemplary hearing aid device according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

As used in the disclosure and the appended claims, the singular forms "a," "an," and "the" include plural referents unless the content clearly dictates otherwise. In general, the term "comprising" and "including" only prompts steps and elements that include explicitly identified, and these steps and elements do not constitute a row of rows, methods, or equipment that may also contain other steps or elements.

The flowcharts used in the present disclosure illustrate operations that systems implement according to some embodiments of the present disclosure. It should be understood that the foregoing or following operations may not necessarily be performed exactly in order. Instead, each step may be processed in reverse or simultaneously. At the same time, other operations to these processes may be added, or a step or several operations from these processes may be removed.

The present disclosure illustrates a hearing aid device. The hearing aid device may be a device used to collect external sounds and amplify the external sounds to compensate for the hearing of a user with impaired hearing. In some embodiments, the hearing aid device may include an air-conducted hearing aid device and a bone-conducted hearing aid device. The air-conducted hearing aid is a device that transmits an amplified sound signal from an auricle and a middle ear to an eardrum through air conduction. When the hearing of the user with impaired hearing is damaged or degraded severely, the air-conducted hearing aid device may not improve the hearing effect of the user effectively. The bone-conducted hearing aid is a device that generates bone-conducted sound waves through a vibration component. When the user with impaired hearing wears a bone-conducted hearing aid device, the bone-conducted sound waves generated by the vibration component may be transmitted to the auditory nerve of the user through human bones. The bone-conducted hearing aid device may have a good effect on improving hearing for the user with impaired hearing that has problems with the auricle and the middle ear. In some embodiments, the vibration component of the bone-conducted hearing aid device may transmit the mechanical vibration to a housing structure through a connector, which causes the housing structure to vibrate. The vibration of the housing structure may push the surrounding air, which causes the air-conducted sound leakage. In some embodiments, the sound transmitter (e.g., a microphone) of the hearing aid device may collect the air-conducted sound leakage generated by the vibration of the housing structure while collecting the external sounds. When the volume of the generated air-conducted sound leakage is large, howling may be generated by the hearing aid device. The hearing aid device described in the embodiments of the present disclosure may include at least one sound transmitter, a signal processing circuit, at least one vibration loudspeaker, and a housing structure. The sound transmitter may be configured to collect a sound signal and convert the sound signal into an electrical signal. The vibration loudspeaker may be configured to convert a control signal into a vibration signal. The housing structure may be configured to accommodate at least one of the at least one sound transmitter, the signal processing circuit, or the at least one vibration loudspeaker. The control signal may include an original signal and an air-conducted sound leakage signal generated from the at least one vibration loudspeaker. The original signal may refer to the signal generated by processing the external sound signal, which does not include the air-conducted sound leakage signal generated by the vibration of the vibration loudspeaker, through the signal processing circuit. The difference between the air-conducted sound leakage signal received by the at least one sound transmitter from the at least one vibration loudspeaker and the original signal may not be larger than −33 dB. In some embodiments, in a frequency range of 100 Hz-2000 Hz, the difference between the air-conducted sound leakage signal received by the at least one sound transmitter from the at least one vibration loudspeaker and the original signal may not be larger than −40 dB. In some embodiments, in a frequency range of 2000 Hz-8000 Hz, the difference between the air-conducted sound leakage signal received by the at least one sound transmitter from the at least one vibration loudspeaker and the original signal may not be larger than −33 dB. In some embodiments, in a frequency range of 100 Hz-2000 Hz, the difference between the air-conducted sound leakage signal received by the at least one sound transmitter from the at least one vibration loudspeaker and the original signal may not be larger than −45 dB. In some embodiments, in a frequency range of 2000 Hz-8000 Hz, the difference between the air-conducted sound leakage signal received by the at least one sound transmitter from the at least one vibration loudspeaker and the original signal may not be larger than −38 dB. In some embodiments, a distance between the vibration loudspeaker and the sound transmitter may be adjusted so that the difference between the air-conducted sound leakage signal received by the sound transmitter and the original signal may not be larger than −33 dB. In some embodiments, a baffle structure may be arranged between the vibration loudspeaker and the sound transmitter, or the vibration loudspeaker and the sound transmitter may be arranged on both sides of the auricle of the user, so that the difference between the air-conducted sound leakage signal received by the sound transmitter and the original signal may not be larger than −33 dB. In some embodiments, a hole may be arranged on a sidewall of a first housing structure of the vibration loudspeaker, so that the difference between the air-conducted sound leakage signal received by the sound transmitter and the original signal may not be larger than −33 dB. According to the embodiments of the present disclosure, the value of the air-conducted sound leakage signal received by the sound transmitter may be reduced, so that an absolute value of the difference (also referred to as an attenuation) between the air-conducted sound leakage signal received by the sound transmitter and the original signal may be larger than the difference (also referred to as a gain) between the original signal and the sound signal. A maximum output volume of the hearing aid device may be increased by suppressing the howling. It should be noted that the air-conducted sound leakage signal from the vibration loudspeaker and the original signal in the control signal may refer to the electrical signal processed by the signal processing circuit.

FIG. 1 illustrates a frequency response curve of a vibration signal and a frequency response curve of an air-conducted sound leakage signal of an exemplary hearing aid device according to some embodiments of the present disclosure. As shown in FIG. 1, the abscissa in FIG. 1 may represent frequencies of the signals, and the ordinate in FIG. 1 may represent sound pressure levels of the signals at different frequencies. A comparison result between the frequency response curve corresponding to the vibration signal (the curve marked with "vibration" in FIG. 1) and the frequency response curve corresponding to the air-conducted sound leakage signal (the curve marked with "air-conducted sound leakage" in FIG. 1) shows that in a specific frequency range (e.g., 20 Hz-4000 Hz), the larger the sound pressure level of the vibration signal of the hearing aid device, the larger the sound pressure level of the air-conducted sound leakage signal of the corresponding hearing aid device. It may be seen that within a specific frequency range of the vibration signal, the sound pressure level of the air-conducted sound leakage signal of the hearing aid device may be correlated with the sound pressure level of the vibration signal positively. In some embodiments, a main working frequency range of the hearing aid device may be the frequency range of 200 Hz-4000 Hz of a human voice. The frequency range of the human voice may be within the specific frequency range mentioned above, and under a condition that the vibration signal remains unchanged, by suppressing the air-conducted sound leakage signal in the frequency range of the human voice, the howling of the hearing aid device may be suppressed effectively. It should be noted that the operating frequency band of the hearing aid device is not limited to the above 200 Hz-4000 Hz, and may be adjusted according to the application scenario of the hearing aid device. For example, the working frequency range of the hearing aid device may also be 20 Hz-4000 Hz, 80 Hz-6000 Hz, 100 Hz-8000 Hz, or other frequency ranges.

In some embodiments, to suppress the howling of the hearing aid device, and further improve the hearing effect of the user, so that the user may receive a clearer and more stable sound, the difference between the air-conducted sound leakage signal received by the sound transmitter from the vibration loudspeaker and the original signal may not be larger than −33 dB by adjusting the distance between the vibration loudspeaker and the sound transmitter. For example, the distance between the sound transmitter and the vibration loudspeaker may be increased, so that the energy of the air-conducted sound leakage signal may be lost in a transmission route from the vibration loudspeaker to the sound transmitter, thereby reducing the volume of the air-conducted sound leakage signal received by the sound transmitter. In some embodiments, a baffle structure may be arranged between the vibration loudspeaker and the sound transmitter, so that the difference between the air-conducted sound leakage signal received by the sound transmitter from the vibration loudspeaker and the original signal may not be larger than −33 dB. For example, the sound transmitter and the vibration loudspeaker may also be arranged on both sides of the auricle of the user (the auricle of the user may be approximately regarded as a baffle structure) to reduce the volume of the air-conducted sound leakage signal received by the sound transmitter. As another example, a baffle structure may also be arranged between the vibration loudspeaker and the loudspeaker. As another example, the sound transmitter and the vibration loudspeaker may be arranged on both sides of the housing structure, and the housing structure may be approximately considered as a baffle structure. In some embodiments, the air-conducted sound leakage generated by the vibration loudspeaker may also be reduced, so that the difference between the air-conducted sound leakage signal received by the sound transmitter from the vibration loudspeaker and the original signal may not be larger than −33 dB. For example, at least one hole may be arranged on the first housing structure of the vibration loudspeaker in the hearing aid device. The at least one hole may lead the air vibration inside the first housing structure to the outside to cancel out the air-conducted sound leakage signal outside the first housing structure, thereby reducing the air-conducted sound leakage signal received by the sound transmitter. According to the embodiments of the present disclosure, the air-conducted sound leakage signal received by the sound transmitter may be reduced through the manners mentioned above, so that the hearing aid device may avoid howling effectively. In some embodiments, the reduced air-conducted sound leakage signal may be considered as the gain of the hearing aid device, thereby improving the overall gain effect of the hearing aid device.

In some embodiments, the hearing aid device may be combined with glasses, earphones (e.g., wired earphones and wireless earphones), head-mounted display devices, AR/VR helmets, or other products. For example, the hearing aid device may be applied to glasses. For example, the hearing aid device may be arranged at an end of the glasses temple that is close to the ear of the user, so that the hearing aid device may be arranged on a peripheral side of the auricle of the user when the user wears the glasses. As another example, the hearing aid device may be applied to a VR helmet. For example, the hearing aid device may be arranged on a housing of the VR helmet that is close to the ear of the user.

Figure 2:
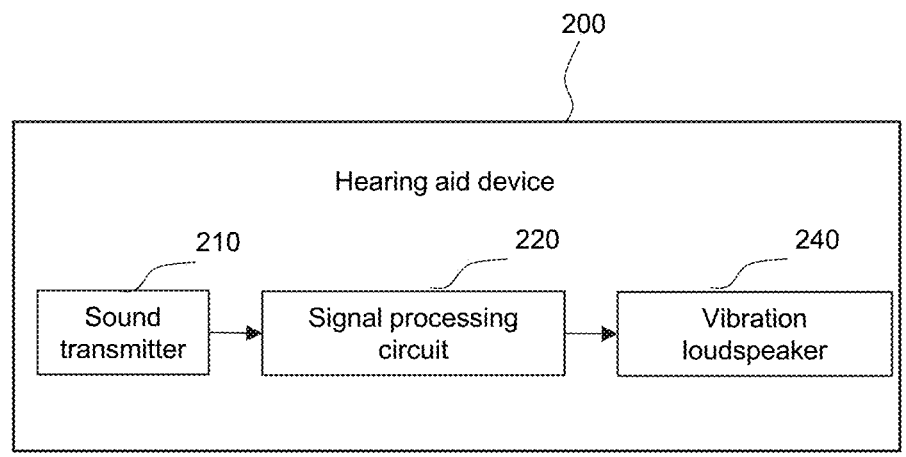
FIG. 2 is a block diagram of an exemplary hearing aid device according to some embodiments of the present disclosure.

FIG. 2 is a block diagram of an exemplary hearing aid device according to some embodiments of the present disclosure. As shown in FIG. 2, the hearing aid device 200 may include a sound transmitter 210, a signal processing circuit 220, and a vibration loudspeaker 240. The sound transmitter 210 may collect an external sound signal and convert the external sound signal into an electrical signal. In some embodiments, the sound transmitter 210 may be a moving coil sound transmitter, a ribbon sound transmitter, a condenser sound transmitter, an electret sound transmitter, an electromagnetic sound transmitter, a carbon particle sound transmitter, or the like, or any combination thereof. In some embodiments, the sound transmitter 210 may include a bone-conducted sound transmitter and an air-conducted sound transmitter, which are distinguished by the way of sound collection.

The signal processing circuit 220 may perform signal processing on the electrical signal converted by the sound transmitter 210 to generate a control signal. The signal processing mentioned herein may include at least one of signal amplification, phase adjustment, filtering processing, or the like, or any combination thereof. In some embodiments, the signal processing circuit 220 may include an equalizer (EQ), a dynamic range controller (DRC), a phase processor (GAIN), or the like, or any combination thereof.

The vibration loudspeaker 240 may be electrically connected to the signal processing circuit 220 to receive the control signal, and generate corresponding bone-conducted sound waves based on the control signal. The bone-conducted sound waves may be transmitted to the auditory nerve of the user through the bones of the human body. The bone-conducted sound waves may refer to sound waves that are conducted by mechanical vibrations through the bones of the human body to the ears of the user. In some embodiments, the vibration loudspeaker 240 may be an electrodynamic loudspeaker (e.g., a moving coil loudspeaker), a magnetic loudspeaker, an ion loudspeaker, an electrostatic loudspeaker (or a capacitive loudspeaker), a piezoelectric loudspeaker, or the like. In some embodiments, the vibration loudspeaker 240 may be an independent functional device, or may be a part of a single device capable of implementing multiple functions. In some embodiments, the signal processing circuit 220 may be integrated with the vibration loudspeaker 240 and/or formed together as one-piece.

In some embodiments, the hearing aid device 200 may further include a housing structure (not shown in FIG. 2). In some embodiments, the housing structure may be configured to accommodate at least one sound transmitter, the signal processing circuit, the vibration loudspeaker, or the like, or any combination thereof. For example, the sound transmitter may be arranged at one end of a mounting cavity inside the housing structure. The vibration loudspeaker may be arranged at one end of the mounting cavity inside the housing structure opposite to the end where the sound transmitter is arranged. In some embodiments, the sound transmitter and the vibration loudspeaker may be arranged in a same mounting cavity of the housing structure. In some embodiments, the housing structure may include a first mounting cavity and a second mounting cavity. The first mounting cavity and the second mounting cavity may be connected or disconnected. The sound transmitter may be arranged in the first mounting cavity, and the vibration loudspeaker may be arranged in the second mounting cavity. In some embodiments, when the vibration loudspeaker and the sound transmitter are arranged in a mounting cavity inside the housing structure, the mounting cavity inside the housing structure may be arranged with a baffle structure. The baffle structure may be fixedly connected to the housing structure of the hearing aid device. The baffle structure may block the air-conducted sound leakage signal generated by the vibration loudspeaker from being transmitted to the sound transmitter, so that the air-conducted sound leakage signal of the vibration loudspeaker received by the sound transmitter may be reduced effectively, thereby preventing the hearing aid device from whistling during working. It should be noted that the vibration loudspeaker and the sound transmitter may not be limited to the mounting cavity inside the housing structure. In some embodiments, all or partial structures of the vibration loudspeaker and the sound transmitter may be arranged on an outer surface of the housing structure. For example, the part of the vibration loudspeaker in contact with the body of the user may protrude with respect to the outer surface of the housing structure. When the vibration loudspeaker and the sound transmitter are arranged on both sides of the outside of the housing structure, the housing structure may be considered as the baffle structure. The housing structure considered as the baffle structure may reduce the air-conducted sound leakage signal of the vibration loudspeaker received by the sound transmitter effectively, thereby preventing the hearing aid device from howling during working. It should be noted that the vibration loudspeaker or the sound transmitter may not be both inside the housing structure. For example, the vibration loudspeaker may be arranged inside the housing structure, and the sound transmitter may be arranged in other devices (e.g., glasses temples, ear hooks, etc.).

In some embodiments, the housing structure may be a closed housing structure with a hollow inside. In some embodiments, the sound transmitter and the vibration loudspeaker may be fixedly connected to the housing structure. Merely by way of example, when the hearing aid device is applied to glasses, the housing structure of the hearing aid device may be installed at an end of the glasses temples. The end of the glasses temples may be an end of the temples that is close to the ears of the user when the user wears the glasses. The housing structure of the hearing aid device may be arranged near the auricle (e.g., the front side of the auricle, the rear side of the auricle, etc.). Further, by changing the position of the housing structure relative to the glasses temples or by changing the shape of the housing structure, the vibration loudspeaker and the sound transmitter in the housing structure may be arranged on the same side or different sides of the auricle. As another example, when the hearing aid device is applied to the rear-hanging earphones, the housing structure may also be installed at an end of an ear-hook structure of the rear-hanging earphone. When the user wears rear-hanging earphones, the end of the ear-hook structure may be located near the auricle of the user. Further, the position of the housing structure relative to the ear hook structure or the shape of the housing structure may be changed so that the vibration loudspeaker and the sound transmitter inside the housing structure may be arranged on the same side or different sides of the auricle.

In some embodiments, the hearing aid device 200 may be worn on the body of the user (e.g., the human head, neck, or upper torso) through the housing structure. At the same time, the housing structure and the vibration loudspeaker 240 may be close to but not block the ear canal, so that the ears of the user may be kept open to improve the wearing comfort. For example, the hearing aid device 200 may be arranged around or partly around the circumference of the ears of the user. In some embodiments, the hearing aid device 200 may be combined with products such as glasses, a headset, a head-mounted display device, an AR/VR helmet, or the like. The housing structure may be fixed near the ears of the user by hanging or clamping. In some embodiments, a hook may be arranged on the housing structure, and the shape of the hook may match the shape of the auricle, so that the hearing aid device 200 may be worn on the ears of the user through the hook independently. The independently worn hearing aid device 200 may communicate with a signal source (e.g., a computer, a mobile phone, or other mobile devices) in a wired or wireless manner (e.g., Bluetooth™). For example, the hearing aid device 200 at the left and right ears may be directly communicated with the signal source in a wireless manner. As another example, the hearing aid device 200 at the left and right ears may include a first output device and a second output device. The first output device may communicate with the signal source, and the second output device may be connected to the first output device in a wireless manner. One or more synchronization signals may be used between the first output device and the second output device to synchronize audio playback. The wireless connection manner may include Bluetooth™, local area network, wide area network, wireless personal area network, near field communication, or the like, or any combination thereof.

In some embodiments, the housing structure may be a housing structure with a fitting shape for the human ear, for example, circular, elliptical, polygonal (regular or irregular), U-shaped, V-shaped, semi-circular, so that the housing structure may be hung on the ears of the user directly. In some embodiments, the housing structure may further include one or more fixing structures. In some embodiments, the fixing structure may include an ear hook structure, a head beam, or an elastic band, so that the hearing aid device 200 may be well fixed on the user to prevent the hearing aid device 200 from falling during a user wearing the hearing aid device 200. Merely by way of example, the elastic band may include a headband that may be worn around the head of the user. As another example, the elastic band may include a neckband which may be worn around the neck/shoulder of the user. In some embodiments, the elastic band may be a continuous ribbon, and may be elastically stretched to be worn on the head of the user. The elastic band may also exert pressure on the head of the user, so that the hearing aid device 200 may be firmly fixed on a specific position of the head of the user. In some embodiments, the elastic band may be a discontinuous ribbon. For example, the elastic band may include a rigid portion and a flexible portion. The rigid portion may be made of rigid material (e.g., plastic or metal), and the rigid portion may be fixed to the housing structure of the hearing aid device 200 through a physical connection (e.g., a snap connection, a screw connection, etc.). The flexible portion may be made of an elastic material (e.g., a cloth, a composite material, a neoprene, etc.).

It should be noted that, in some embodiments, the hearing aid device may not include a housing structure configured to accommodate the sound transmitter and the vibration loudspeaker. For example, the sound transmitter and the vibration loudspeaker may be fixed to the structures of other devices (e.g., glasses), and the structures of the other devices may be used as the housing structure of the sound transmitter and the loudspeaker. As another example, when the sound transmitter and the vibration loudspeaker are arranged at the structures of other devices, by adjusting the structures of other devices (e.g., changing the shapes and/or sizes of the structures of other devices, etc.) or adjusting the positions of the vibration loudspeaker and/or the sound transmitter at the structures of other devices, the sound transmitter and the vibration loudspeaker may be arranged on the same side or different sides of the auricle of the user. Further, the distance between the sound transmitter and the vibration loudspeaker may be adjusted by adjusting the positions of the sound transmitter and the vibration loudspeaker in other devices.

Figure 3:
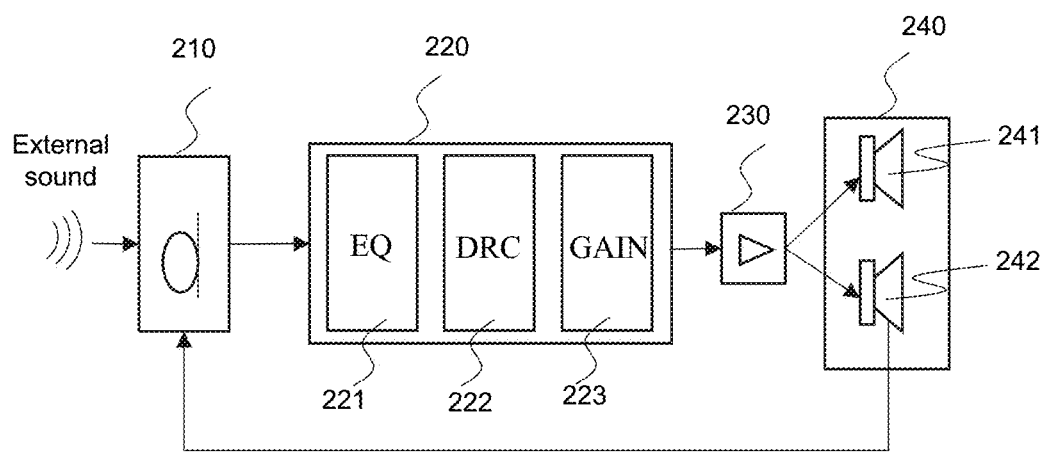
FIG. 3 is a schematic diagram of an exemplary hearing aid device according to some embodiments of the present disclosure.

FIG. 3 is a schematic diagram of an exemplary hearing aid device according to some embodiments of the present disclosure. As shown in FIG. 3, the hearing aid device 200 may include a sound transmitter 210, a signal processing circuit 220, a power amplifier 230, and a vibration loudspeaker 240. The signal processing circuit 220 may include an equalizer (EQ) 221, a dynamic range controller (DRC) 222, a phase processor (GAIN) 223, or the like, or any combination thereof. The sound emitted by the vibration loudspeaker 240 may include a vibration signal 241 and an air-conducted sound leakage signal 242. The vibration signal 241 may correspond to the bone-conducted sound waves, and the air-conducted sound leakage signal 242 may correspond to the air-conducted sound waves. In some embodiments, the vibration signal 241 may be transmitted to the auditory nerve of the user via the bones of the human body as a transmission medium, and the air-conducted sound leakage signal 242 may be transmitted to the auditory nerve of the user via air as the transmission medium.

In some embodiments, the equalizer 221 may be configured to gain and/or attenuate the electrical signal output by the sound transmitter 210 according to a specific frequency range (e.g., a high frequency range, an intermediate frequency range, and a low frequency range). Gaining the electrical signal may refer to increasing the amount of electrical signal amplification. Attenuating the electrical signal may refer to reducing the amount of electrical signal amplification. The equalizer 221 may compensate for the defects of the loudspeaker and the sound field by adjusting (e.g., gaining, attenuating) the electrical signals with different frequencies. In some embodiments, the dynamic range controller (DRC) 222 may be configured to compress and/or amplify the electrical signal. Compressing and/or amplifying the electric signal may refer to reducing and/or increasing the ratio between the input electric signal and the output electric signal in the sound transmitter 210. For example, the dynamic range controller (DRC) 222 may make the sound to be softer or louder. In some embodiments, the phase processor 223 may be configured to adjust the phase of the electrical signal. After the electrical signal is processed by the signal processing circuit 220, a corresponding control signal may be generated. The control signal may be further transferred to the power amplifier 230, and the power amplifier 230 may be configured to amplify the amplitude of the control signal. In some embodiments, the vibration loudspeaker 240 may receive the processed and amplified control signal, and generate a vibration signal based on the control signal. In some application scenarios, the sound transmitter 210 may convert the external sound signal into the electrical signal and transmit the electrical signal to the signal processing circuit 220. The signal processing circuit 220 may process the electrical signal to obtain the original signal with an amplitude of V1. After being amplified by the power amplifier 230, the original signal may be sent to the vibration loudspeaker 240. Part of the air-conducted sound leakage signal and the vibration signal generated by the vibration loudspeaker 240 may be received by the sound transmitter 210. Based on the partial air-conducted sound leakage signal generated by the vibration loudspeaker 240 and the vibration signal, the sound transmitter 210 may generate a signal with an amplitude of V2. The value of the attenuation x may be calculated by the following equation:

$$x = 20 \times \log\left(\frac{V2}{V1}\right) \quad (1)$$

Since the hearing aid device amplifies the sound signal, the signal processing circuit 220 may generate a certain amount of gain G on the input signal, so as to play the role of amplifying the sound signal. For example, if the gain G of the signal processing circuit 220 is set to G=40 dB. The electrical signal transmitted by the sound transmitter 210 to the signal processing circuit 220 may be increased by 40 dB after the corresponding control signal is processed and output by the signal processing circuit 220. An amplitude of a sound signal with amplitude V2 generated by the sound transmitter 210 due to receiving part of the air-conducted sound leakage signal and vibration signal of the vibration loudspeaker 240 may be increased by 40 dB after passing through the signal processing circuit 220. Merely by way of example, if the attenuation amount x=−30 dB, the amplitude V1' of the control signal output by the signal processing circuit 220 may be larger than the amplitude V1 of the original signal by 10 dB, which may become positive feedback and cause howling. Therefore, the hearing aid device may reduce the air-conducted sound leakage signal so that the attenuation |x| may be larger than the gain G to avoid howling.

Figure 4:
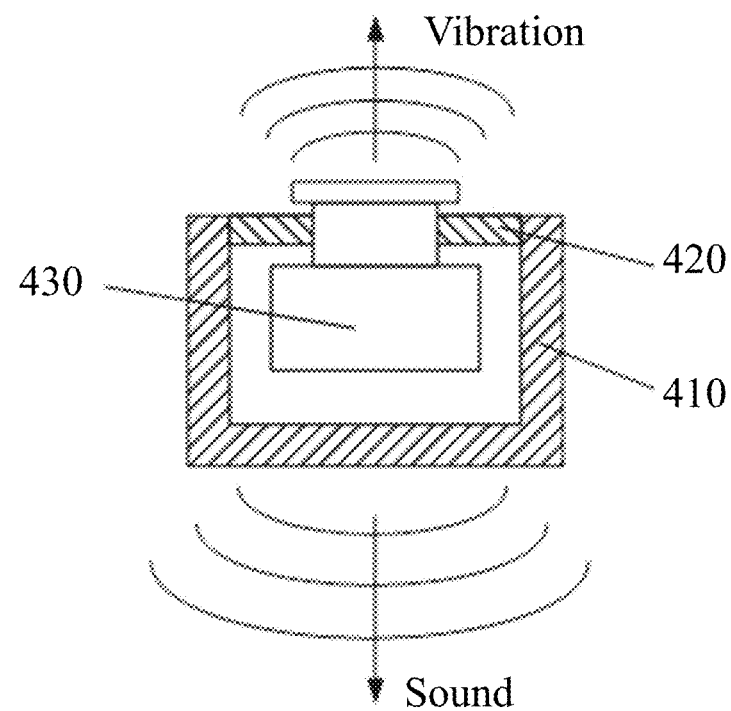
FIG. 4 is a structural diagram of an exemplary vibration loudspeaker according to some embodiments of the present disclosure.

FIG. 4 is a structural diagram of an exemplary vibration loudspeaker according to some embodiments of the present disclosure. As shown in FIG. 4, the vibration loudspeaker 400 may include a first housing structure 410, a connector 420, and a vibration component 430. The first housing structure 410 may be an outer housing of the vibration loudspeaker 400, which is configured to accommodate the connector 420 and the vibration component 430. The vibration component 430 may be connected to the first housing structure 410 through the connector 420. In some embodiments, the vibration component 430 may be electrically connected to the signal processing circuit to receive a control signal, and generate the bone-conducted sound waves based on the control signal. For example, the vibration component 430 may be any element (e.g., a vibration motor, an electromagnetic vibration device, etc.) that converts an electrical signal (e.g., a control signal from the signal processing circuit 220) into a mechanical vibration signal. The signal conversion manner may include an electromagnetic type (e.g., a moving coil type, a moving iron type, a magneto strictive type, etc.), a piezoelectric type, an electrostatic type, or the like, or any combination thereof. In some embodiments, an internal structure of the vibration component 430 may be a single resonance system or a composite resonance system. In some embodiments, the vibration component 430 may perform mechanical vibration according to the control signal, and the mechanical vibration may generate the bone-conducted sound waves (the sound waves indicated by the vibration arrows in FIG. 4). In some embodiments, the vibration component 430 may include a contact portion (not shown in FIG. 4), which may be configured to fit the body skin of the user when the user wears the hearing aid device 200, so that the bone-conducted sound waves may be transmitted to the cochlea of the user via the body of the user.

In some embodiments, the first housing structure 410 and the vibration component 430 may be coupled. The first housing structure 410 may generate the air-conducted sound waves (indicated by an arrow marked with "sound" in FIG. 4) based on the bone-conducted sound waves (indicated by an arrow marked with "vibration" in FIG. 4). In some embodiments, the first housing structure 410 and the vibration component 430 may be connected to each other through the connector 420. The first housing structure 410 may serve as a secondary resonance system for a first mechanical vibration. On the one hand, the first housing structure 410 may be used as a mechanical system to generate a second mechanical vibration under the excitation of the first mechanical vibration. On the other hand, after the second mechanical vibration is transmitted into the air to form sound (i.e., the air-conducted sound waves), an inner space of the first housing structure 410 may be used as a resonant cavity to amplify the sound. In some embodiments, the frequency response of the first housing structure 410 may be adjusted by adjusting the connector 420 between the first housing structure 410 and the vibration component 430. For example, the connector 420 may be a rigid member, and the connector 420 may also be an elastic member. In some embodiments, the connector 420 may be an elastic member, e.g., a spring, an elastic piece, or the like, or any combination thereof. In some embodiments, the responses of systems with different elastic coefficients with the same frequency input may have different amplitudes. Therefore, by changing the elastic coefficient of the connector 420 and/or the elastic coefficient and/or changing a mass of the first housing structure 410, the amplitude response of the second mechanical vibration to the excitation of different frequencies may be adjusted.

In some embodiments, the hearing aid device 200 shown in FIG. 2 may directly output the bone-conducted sound waves when the vibration component 430 is working. For example, the bone-conducted sound waves may be transmitted to human auditory nerves by attaching human skin. At the same time, the first mechanical vibration generated by the vibration component 430 may be transmitted to the first housing structure 410 through the connector 420, so that the first housing structure 410 may also have a certain vibration, that is, the second mechanical vibration. The second mechanical vibration may be used as a sound source of the air-conducted sound waves to emit the sound to the outside, so that the hearing aid device may simultaneously output the bone-conducted sound waves and the air-conducted sound waves.

It should be noted that the vibration loudspeaker shown in FIG. 4 may be a cuboid structure. In some embodiments, the vibration loudspeaker may also have other shape structures, for example, a polygonal (regular and/or irregular) three-dimensional structure, a cylinder, a round table, a vertebral body, or other geometric structures.

Figure 5:
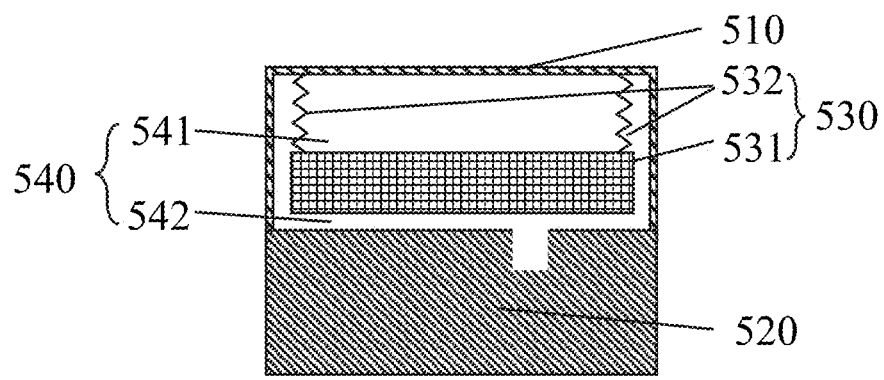
FIG. 5 is a structural diagram of an exemplary sound transmitter according to some embodiments of the present disclosure.

FIG. 5 is a structural diagram of an exemplary sound transmitter according to some embodiments of the present disclosure. In order to further illustrate the sound transmitter, a bone-conducted sound transmitter may be taken as an example to be illustrated below. As shown in FIG. 5, the sound transmitter 500 may include a second housing structure 510, an acoustic transducer 520, and a vibration unit 530. The second housing structure 510 may be an outer housing of the sound transmitter 500. In some embodiments, the second housing structure 510 may be configured to accommodate the acoustic transducer 520 and the vibration unit 530. In some embodiments, the second housing structure 510 may be in contact with the skin of the human body and receive the vibration signal of the muscle when the human is speaking. The vibration unit 530 may vibrate in response to the vibration signal of the second housing structure 510. Since a vibration phase of the vibration unit 530 is different from a vibration phase of the second housing structure 510 and a vibration phase of the acoustic transducer 520, the vibration of the vibration unit 530 may cause the volume of the cavity in the second housing structure 510 (e.g., a second acoustic cavity 542) to change, which in turn causes the sound pressure of the cavity in the second housing structure 510 to change. The acoustic transducer 520 may convert the change of the sound pressure of the cavity in the second housing structure 510 into an electrical signal. In some embodiments, the shape of the sound transmitter 500 may include a cuboid, a cylinder, or other regular or irregular structures. In some embodiments, the second housing structure 510 and the acoustic transducer 520 may be physically connected. The physical connection may include connection manners such as welding, clamping, bonding, integral molding, or the like, or any combination thereof. In some embodiments, the second housing structure 510 and the acoustic transducer 520 may enclose a package structure having a first acoustic cavity 540. The vibration unit 530 may be arranged in the first acoustic cavity 540 of the package structure. In some embodiments, the second housing structure 510 may independently form a package structure with the first acoustic cavity 540. The vibration unit 530 and the acoustic transducer 520 may be arranged in the first acoustic cavity 540 of the package structure. In some embodiments, the vibration unit 530 may divide the first acoustic cavity 540 into a second acoustic cavity 542 and a third acoustic cavity 541. The second acoustic cavity 542 may be in acoustic communication with the acoustic transducer 520. In some embodiments, the third acoustic cavity 541 may be an acoustically sealed cavity structure.

In some embodiments, the vibration unit 530 may include a mass element 531 and an elastic element 532. In some embodiments, the elastic element 532 may be configured to connect the mass element 531 and the second housing structure 510 or the acoustic transducer 520. A deformation may occur when the second housing structure 510 vibrates so that the mass element 531 and the second housing structure 510 may move relative to each other. In some embodiments, the mass element 531 may be connected to the second housing structure 510 through the elastic element 532. For example, the elastic element 532 may be arranged on a side of the mass element 531 away from the acoustic transducer 520. One end of the elastic element 532 may be connected to the second housing structure 510, and the other end of the elastic element 532 may be connected to the mass element 531.

In some embodiments, the elastic element 532 may also be arranged on a peripheral side of the mass element 531. An inner side of the elastic element 532 may be connected to the peripheral side of the mass element 531, and an outer side of the elastic element 532 or a side facing away from the acoustic transducer 520 may be connected to the housing structure 510. The peripheral side of the mass element 531 may be relative to the vibration direction of the mass element 531. For convenience, a direction in which the mass element 531 vibrates relative to the housing structure 510 may be considered as an axis direction. The peripheral side of the mass element 531 may refer to the side of the mass element 531 arranged around the axis. In some embodiments, the mass element 531 may also be connected to the acoustic transducer 520 through the elastic element 532. An exemplary elastic element 532 may be a round tube, a square tube, a special-shaped tube, a ring, a flat plate, or the like. In some embodiments, the elastic element 532 may have a structure that is easier to undergo elastic deformation (e.g., a spring structure, a metal ring piece, etc.), and the material may be a material that is easier to undergo elastic deformation, such as silica gel, rubber, or the like. According to the embodiments of the present disclosure, the elastic element 532 may be easier to undergo elastic deformation than the second housing structure 510, so that the vibration unit 530 may move relative to the second housing structure 510.

It should be noted that in some embodiments, the mass element 531 and the elastic element 532 may be independent elements and assembled together to form the vibration unit 530. In some embodiments, the mass element 531 and the elastic element 532 may also be an integrally formed structure. In some embodiments, the mass element 531 and the elastic element 532 may also be composed of the same or different materials.

The sound transmitter 500 may convert the external vibration signal into the electrical signal. In some embodiments, the external vibration signal may include a vibration signal when a person speaks, a vibration signal generated by the skin moving with the human body or working with a loudspeaker close to the skin, a vibration signal generated by an object or the air in contact with the sound transmitter, or any combination thereof. Further, the electrical signal generated by the sound transmitter 500 may be input into a signal processing circuit for processing, and the electrical signal may be amplified by a power amplifier. The vibration loudspeaker (such as the vibration loudspeaker 400 shown in FIG. 4) may be controlled to generate a vibration signal.

In some embodiments, when the sound transmitter 500 is working, the external vibration signal may be transmitted to the vibration unit 530 through the second housing structure 510, and the vibration unit 530 may vibrate in response to the vibration of the second housing structure 510. Since the vibration phase of the vibration unit 530 is different from the vibration phase of the second housing structure 510 and the vibration phase of the acoustic transducer 520, the vibration of the vibration unit 530 may cause a volume change of the second acoustic cavity 542, which in turn causes a sound pressure of the second acoustic cavity 542 to change. The acoustic transducer 520 may detect the change of the sound pressure of the second acoustic cavity 542 and convert the change of the sound pressure into the electrical signal. The electrical signal may be transmitted to the vibration loudspeaker in a wired or wireless manner. In some embodiments, the acoustic transducer 520 may include a diaphragm (not shown in FIG. 5). When the sound pressure of the second acoustic cavity 542 changes, the air inside the second acoustic cavity 542 may vibrate and act on the diaphragm to make the diaphragm be deformed. The acoustic transducer 520 may convert the vibration signal of the diaphragm into the electrical signal.

It should be noted that the sound transmitter may not be limited to the bone-conducted sound transmitter shown in FIG. 5. The sound transmitter may also be an air-conducted sound transmitter. The difference between the structure of the air-conducted sound transmitter and the structure of the bone-conducted sound transmitter shown in FIG. 5 may be that the vibration unit 530 shown in FIG. 5 may not be included. One or more holes (not shown in the figures) may be arranged on the second housing structure 510 of the air-conducted sound transmitter to transmit external sound information (e.g., the air-conducted sound waves). The air-conducted sound waves may act on the diaphragm of the acoustic transducer 520 to make the diaphragm be deformed, and the acoustic transducer 520 may convert the vibration signal of the diaphragm into the electrical signal.

Figure 6:
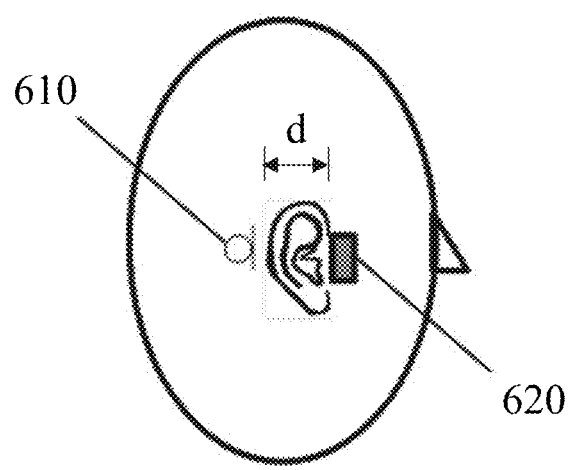
FIG. 6 illustrates a user wearing a hearing aid device according to some embodiments of the present disclosure.

The vibration loudspeaker (e.g., the vibration loudspeaker 400) may generate the bone-conducted sound waves while generating the air-conducted sound waves (the air-conducted sound leakage signal). The air-conducted sound waves may be received by the sound transmitter (e.g., the sound transmitter 500). When the volume of the air-conducted sound wave is great, howling may appear in the hearing aid device. In some embodiments, in order to solve the howling problem of the hearing aid device effectively, the distance between the sound transmitter and the vibration loudspeaker or the position relative to the auricle of the user may be adjusted. For example, the sound transmitter and the vibration loudspeaker may be arranged on the front and rear sides of the auricle of the user, respectively. The auricle of the user may block the transmission of the air-conducted sound waves, and increase an effective transmission route length of air-conducted sound waves, thereby reducing the volume of the air-conducted sound waves received by the sound transmitter. FIG. 6 illustrates a user wearing a hearing aid device according to some embodiments of the present disclosure. Merely by way of example, when the user wears the hearing aid device, the sound transmitter and the vibration loudspeaker are arranged on the front and rear sides of the auricle of the user, respectively. As shown in FIG. 6, when the user wears the hearing aid device, the sound transmitter 610 may be arranged on the rear side of the auricle of the user, and the vibration loudspeaker 620 may be arranged on the front side of the auricle of the user. The front side of the auricle may refer to a side of the auricle facing the front side of the human body (e.g., the human face). The rear side of the auricle may refer to a side opposite to the front side, that is, facing the rear side of the human body (e.g., the rear part of the human head). Due to the existence of the auricle of the user, the effective transmission route length of the air-conducted sound waves generated by the vibration loudspeaker 620 may be increased during the transmission process to the sound transmitter 610, thereby reducing the volume of the air-conducted sound waves received by the sound transmitter 610, and further suppressing the howling of the hearing aid device effectively.

It should be noted that the positions of the sound transmitter 610 and the vibration loudspeaker 620 may not be limited to that the sound transmitter 610 is arranged at the rear side of the auricle of the user and the vibration loudspeaker 620 is arranged at the rear side of the auricle of the user. For example, the sound transmitter 610 may also be arranged on the front side of the auricle of the user, and the vibration loudspeaker 620 may be arranged on the rear side of the auricle of the user. As another example, when the user wears the hearing aid device, the sound transmitter 610 and the vibration loudspeaker 620 may also be arranged on the same side of the auricle of the user (e.g., the front side of the auricle and/or the rear side of the auricle). It should be noted that the sound transmitter 610 and the vibration loudspeaker 620 may be arranged on the front side and/or the rear side of the auricle of the user at the same time. The position of the front side and/or the rear side herein may refer to a position in front of the auricle of the user and/or a position in the rear of the auricle of the user, and may also refer to a position in oblique front and/or in oblique rear of the auricle of the user. It should be noted that the sound transmitter 610 and the vibration loudspeaker 620 may also be arranged on the same side of the auricle of the user at the same time (e.g., the front side or the rear side of the auricle of the user). When the sound transmitter 610 and the vibration loudspeaker 620 are arranged on the same side of the auricle at the same time, the housing structure may be configured as a baffle structure, and the sound transmitter 610 and the vibration loudspeaker 620 may be arranged on both sides of the baffle structure. In some embodiments, the sound transmitter 610 and the vibration loudspeaker 620 may be arranged on both sides of the housing structure. Further, when the vibration loudspeaker 620 on a side of the housing structure generates the air-conducted sound waves, the air-conducted sound waves may need to bypass the housing structure before being received by the sound transmitter 610 on the other side of the housing structure.

In some embodiments, a distance d between the vibration loudspeaker and the sound transmitter may also be adjusted to reduce the air-conducted sound waves received by the sound transmitter. The distance between the vibration loudspeaker and the sound transmitter may refer to the minimum distance between the vibration loudspeaker and the sound transmitter. Further, the distance between the vibration loudspeaker and the sound transmitter may refer to the minimum distance between the first housing structure in the vibration loudspeaker and the second housing structure in the sound transmitter. The air-conducted sound waves may be attenuated in the transmission route from the vibration loudspeaker to the sound transmitter. By increasing the distance between the sound transmitter and the vibration loudspeaker, the magnitude of the air-conducted sound waves of the vibration loudspeaker received by the sound transmitter may be reduced effectively, thereby suppressing the howling of the hearing aid device.

Merely by way of example, a hearing loss for a user with mild impaired hearing may be in a range of 26 dB-40 dB. When no howling occurs, it may be necessary to ensure that a maximum internal gain of the hearing aid device (hereinafter is abbreviated as a maximum non-howling internal gain) may not be less than 26 dB. The internal gain may refer to a difference between an output sound pressure level of the hearing aid device and an input sound pressure level. When the internal gain of the hearing aid device is at least larger than the hearing loss of the user with impaired hearing, a hearing aid effect for the user with mild impaired hearing may be achieved. When the distance between the vibration loudspeaker and the sound transmitter is about 7 mm, a measured maximum non-howling internal gain may be about 26 dB. When the distance between the vibration loudspeaker and the sound transmitter is about 40 mm, a measured maximum non-howling internal gain may be about 40 dB. When the distance between the vibration loudspeaker and the sound transmitter is about 45 mm, a measured maximum non-howling internal gain may be about 42 dB.

In some embodiments, in order to ensure that the howling of the hearing aid device does not occur, the distance between the sound transmitter and the vibration loudspeaker may not be less than 7 mm. For example, the distance between the sound transmitter and the vibration loudspeaker may not be less than 20 mm. As another example, the distance between the sound transmitter and the vibration loudspeaker may not be less than 36 mm. As still another example, the distance between the sound transmitter and the vibration loudspeaker may not be less than 45 mm. It should be noted that when a count of the at least one sound transmitter is plural, the distance between each sound transmitter and the vibration loudspeaker may also be within the range mentioned above. When a count of the at least one sound transmitter is plural and a count of the at least one vibration loudspeaker is plural, the distance between each sound transmitter and each vibration loudspeaker may also be within the range mentioned above. In addition, it should be noted that when the hearing aid device is applied to the users with impaired hearing under different hearing losses, the distance between the vibration loudspeaker and the sound transmitter may be adjusted adaptively.

In order to suppress the howling of the hearing aid device, and further improve the hearing effect of the user, so that the user may receive a clearer and more stable sound, the air-conducted sound leakage signal generated by the vibration loudspeaker may be reduced, thereby reducing the air-conducted sound leakage signal received by the sound transmitter, and suppressing the howling of the hearing aid device effectively.

In some embodiments, the vibration loudspeaker may include at least one hole. The at least one hole may be arranged on a sidewall of the first housing structure, and the at least one hole may be in communication with the inside of the first housing structure. The at least one hole may lead out the air vibration inside the first housing structure in the vibration loudspeaker. The air vibration led out from the inside of the first housing structure may cancel out the air-conducted sound leakage outside the first housing structure. The phase of the air vibration led out from the inside of the first housing structure may be opposite to the phase of the air-conducted sound leakage outside the vibration loudspeaker, so that the air vibration led out from the inside of the first housing structure and the air-conducted sound leakage outside the first housing structure may be canceled, thereby reducing the air-conducted sound leakage of the vibration loudspeaker. In some embodiments, a shape of a hole of the at least one hole may be a regular or irregular shape such as a circle, a semicircle, an ellipse, a semi ellipse, a triangle, a quadrilateral, a pentagon, or the like. In some embodiments, when a count of the at least one hole is plural, the shapes of two holes of the at least one hole may be the same or different.

Figure 7:
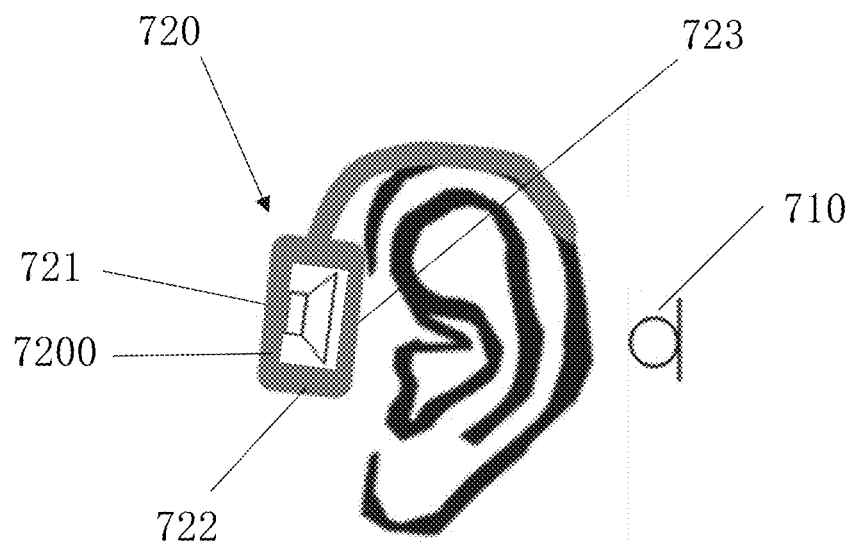
FIG. 7 illustrates a user wearing a hearing aid device according to some embodiments of the present disclosure.

In some embodiments, the magnitude of the air-conducted sound leakage signal generated by the vibration loudspeaker may be further reduced by adjusting the position of the at least one hole in the first housing structure, thereby reducing the magnitude of the air-conducted sound leakage signal received by the sound transmitter. FIG. 7 illustrates a user wearing a hearing aid device according to some embodiments of the present disclosure. As shown in FIG. 7, when the user wears the hearing aid device, the sound transmitter 710 may be arranged on the rear side of the auricle of the user, and the vibration loudspeaker 720 may be arranged on the front side of the auricle of the user. A wearing manner as shown in FIG. 7 may be implemented in various ways such as spectacles temples, a rear-hanging structure, an ear hanging, a head-mounted device, or the like. For example, the rear-hanging hearing aid device worn by the user may surround or partially surround the head or the neck of the user to fix the hearing aid device. The sound transmitter 710 may be arranged at a position close to the rear side of the auricle of the user, and the vibration loudspeaker 720 may be arranged at a position close to the front side of the auricle of the user.

Hereinafter, the position of the at least one hole may be exemplary in a manner in which the user wears the hearing aid device shown in FIG. 7. As shown in FIG. 7, the at least one hole (not shown in the figures) may be arranged on at least one side surface of the first housing structure 7200 in the vibration loudspeaker 720. For example, when a count of the at least one hole is one, the hole may be arranged on any side surface of the first housing structure 7200. As another example, when the count of the at least one hole is plural, the plurality of holes may be arranged on different side surfaces of the first housing structure 7200, respectively. As another example, the plurality of holes may also be arranged on one side surface of the first housing structure 7200. Further, in some embodiments, the plurality of holes may be arranged on specific side surfaces of the first housing structure 7200. When the plurality of holes is arranged on a specific side surface of the first housing structure 7200, the effect of reducing the air-conducted sound leakage may be further improved. In some embodiments, the specific side surface may include the rear side 723 of the housing, the front side 721 of the housing, and the bottom 722 of the housing. The rear side 723 of the housing may refer to a side of the first housing structure 7200 of the vibration loudspeaker 720 facing the sound transmitter 710. The front side of the housing 721 may refer to a side of the housing structure corresponding to the vibration loudspeaker 720 that is away from the sound transmitter 710. The bottom 722 of the housing may refer to a bottom sidewall of the housing structure corresponding to the vibration loudspeaker 720.

Figure 8:
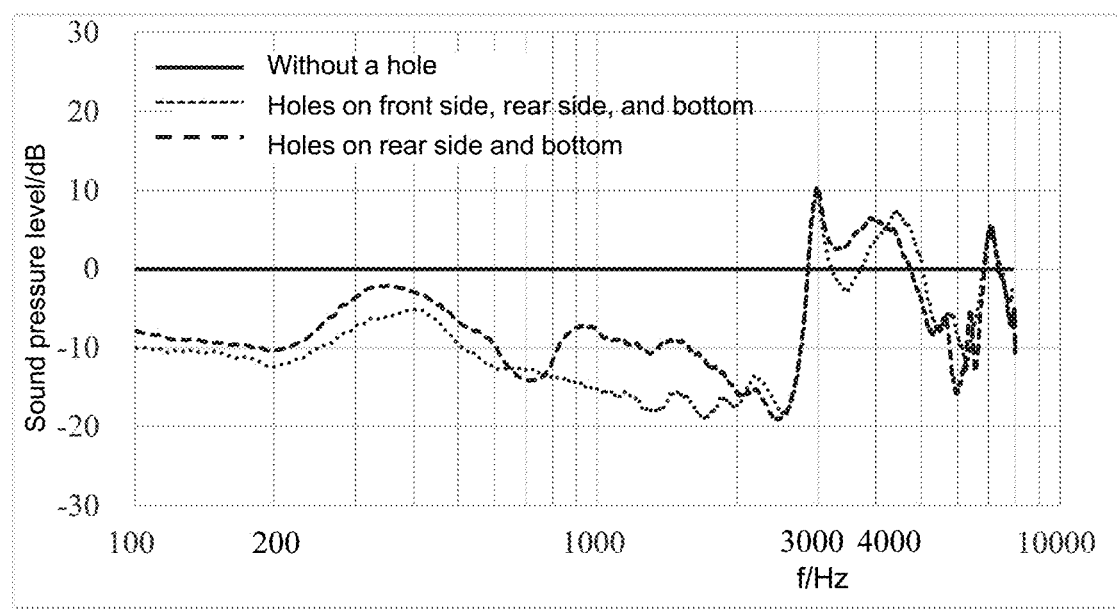
FIG. 8 illustrates frequency response curves of air-conducted sound leakage signals each of which is received by a sound transmitter with holes arranged at different positions of a first housing structure and a sound transmitter without a hole according to some embodiments of the present disclosure.

FIG. 8 illustrates frequency response curves of air-conducted sound leakage signals each of which is received by a sound transmitter with holes arranged at different positions of a first housing structure and a sound transmitter without a hole according to some embodiments of the present disclosure. The abscissa in FIG. 8 may represent the frequencies of the air-conducted sound leakage signals received by the sound transmitter, and the ordinate in FIG. 8 may represent the sound pressure levels of the air-conducted sound leakage signals at different frequencies. It should be noted that an ordinate value in FIG. 8 may be a relative value measured with the sound pressure level of the air-conducted sound leakage signal received by the sound transmitter, which is measured when the first housing structure is not configured with a hole as a reference value (the frequency response curve corresponding to "without a hole" shown in FIG. 8). As shown FIG. 8, in a specific frequency range (e.g., 100 Hz-3000 Hz), the sound pressure level (the frequency response curve corresponding to "holes on front side, rear side, and bottom" shown in FIG. 8) of the air-conducted sound leakage when holes are arranged on the front side of the housing, the rear side of the housing, and the bottom of the housing of the first housing structure and the sound pressure level (the frequency response curve corresponding to "holes on rear side and bottom" shown in FIG. 8) of the air-conducted sound leakage when holes are arranged on the rear side of the housing and the bottom of the housing of the first housing structure may be significantly reduced compared with the a sound pressure level (the frequency response curve corresponding to "without a hole" shown in FIG. 8) of the air-conducted sound leakage when the first housing structure is not arranged with a hole. In some embodiments, in a specific working frequency band (e.g., the human voice frequency range of 200 Hz-4000 Hz), the hearing aid device may reduce the sound pressure level of the sound leakage signal received by the sound transmitter effectively in the frequency range of human voice through arranging holes on different side surfaces of the first housing structure of the vibration loudspeaker, thereby suppressing the howling of the hearing aid device. In addition, the air-conducted sound leakage may also improve the sound gain effect of the hearing aid device under the premise that the howling of the hearing aid device does not occur, thereby improving the maximum output volume of the hearing aid device to meet the needs of a user with more severely impaired hearing.

Referring to FIG. 8, in a specific frequency range (e.g., 100 Hz-3000 Hz), the sound pressure level (the frequency response curve corresponding to the "holes on front side, rear side, and bottom" shown in FIG. 8) of the air-conducted sound leakage when holes are arranged on the front side, the rear side, and the bottom of the housing of the first housing structure may be obviously reduced compared with the sound pressure level (the frequency response curve corresponding to "holes on rear side and bottom" shown in FIG. 8) of the air-conducted sound leakage when holes are arranged on the rear side of the housing and the bottom of the housing of the first housing structure. It should be noted that, by arranging holes on the front side of the housing, the rear side of the housing, and the bottom of the housing of the first housing structure, and arranging holes on the rear side of the housing and the bottom of the housing of the first housing structure, the sound pressure level of the air-conducted sound leakage signal received by the sound transmitter may be reduced effectively, thereby reducing the air-conducted sound leakage signal from the vibration loudspeaker in the control signal (e.g., V2 in equation (1)), so that the difference between the air-conducted sound leakage signal received by the sound transmitter from the vibration loudspeaker and the original signal may not be larger than −33 dB.

Figure 9:
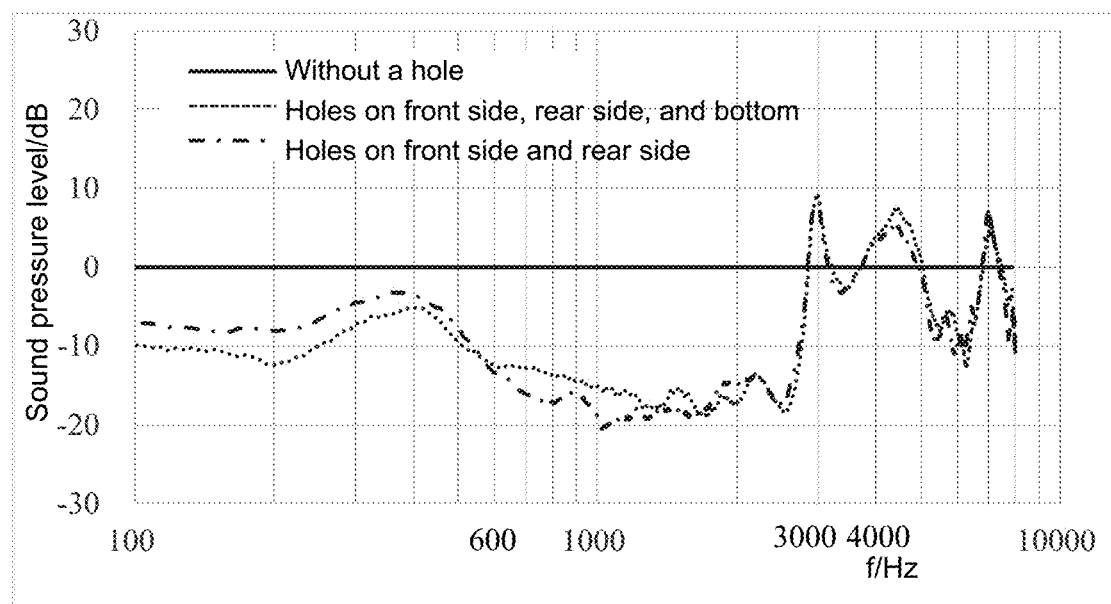
FIG. 9 illustrates frequency response curves of air-conducted sound leakage signals each of which is received by a sound transmitter with holes arranged at different positions of a first housing structure and a sound transmitter without a hole according to some embodiments of the present disclosure.

FIG. 9 illustrates frequency response curves of air-conducted sound leakage signals each of which is received by a sound transmitter with holes arranged at different positions of a first housing structure and a sound transmitter without a hole according to some embodiments of the present disclosure. The abscissa in FIG. 9 may represent the frequencies of the air-conducted sound leakage signals received by the sound transmitter. The ordinate in FIG. 9 may represent the sound pressure levels of the air-conducted sound leakage signals at different frequencies. An ordinate value in FIG. 9 may be a relative value measured with the sound pressure level (the frequency response curve corresponding to "without a hole" shown in FIG. 9) of the air-conducted sound leakage signal received by the sound transmitter when the first housing structure is not configured with a hole as a reference value. As shown FIG. 9, in a specific frequency range (e.g., 100 Hz-3000 Hz), the sound pressure level (the frequency response curve corresponding to "holes on front side, rear side, and bottom" shown in FIG. 9) of the air-conducted sound leakage when holes are arranged on the front side of the housing, the rear side of the housing, and the bottom of the housing of the first housing structure and the sound pressure level (the frequency response curve corresponding to "holes on front side and rear side" shown in FIG. 9) of the air-conducted sound leakage when holes are arranged on the front side of the housing and the rear side of the housing of the first housing structure may be significantly reduced compared with the sound pressure level (the frequency response curve corresponding to "without a hole" shown in FIG. 9) of the air-conducted sound leakage when holes are not arranged on the first housing structure. In some embodiments, in a specific working frequency range (e.g., the human voice frequency range of 200 Hz-4000 Hz), the hearing aid device may effectively reduce the sound pressure level of the sound leakage signal received by the sound transmitter in the human voice frequency range by arranging holes on different side surfaces of the first housing structure of the vibration loudspeaker, thereby suppressing the howling of the hearing aid device. In addition, the air-conducted sound leakage may also improve the sound gain effect of the hearing aid device under the premise that the howling of the hearing aid device does not occur, thereby improving the maximum output volume of the hearing aid device to meet the needs of the user with more severely impaired hearing.

Referring to FIG. 9, in a specific frequency range (e.g., 100 Hz-600 Hz), the sound pressure level (the frequency response curve corresponding to "holes on a front side, rear side, and bottom" shown in FIG. 9) of the air-conducted sound leakage when holes are arranged on the front side of the housing, the rear side of the housing, and the bottom of the housing of the first housing structure may be significantly reduced compared with the sound pressure level (the frequency response curve corresponding to "holes on front side and rear side" shown in FIG. 9) of the air-conducted sound leakage when holes are arranged on the front side of the housing and the rear side of the housing of the first housing structure. It should be noted that, by arranging holes on the front side of the housing, the rear side of the housing, and the bottom of the housing of the first housing structure, and arranging holes on the front side of the housing and the rear side of the housing of the first housing structure, the sound pressure level of the air-conducted sound leakage signal received by the sound transmitter may be effectively reduce, thereby reducing the air-conducted sound leakage signal from the vibration loudspeaker in the control signal (e.g., V2 in equation (1)), so that the difference between the air-conducted sound leakage signal from the vibration loudspeaker received by the sound transmitter and the original signal may not be larger than −33 dB.

Figure 10:
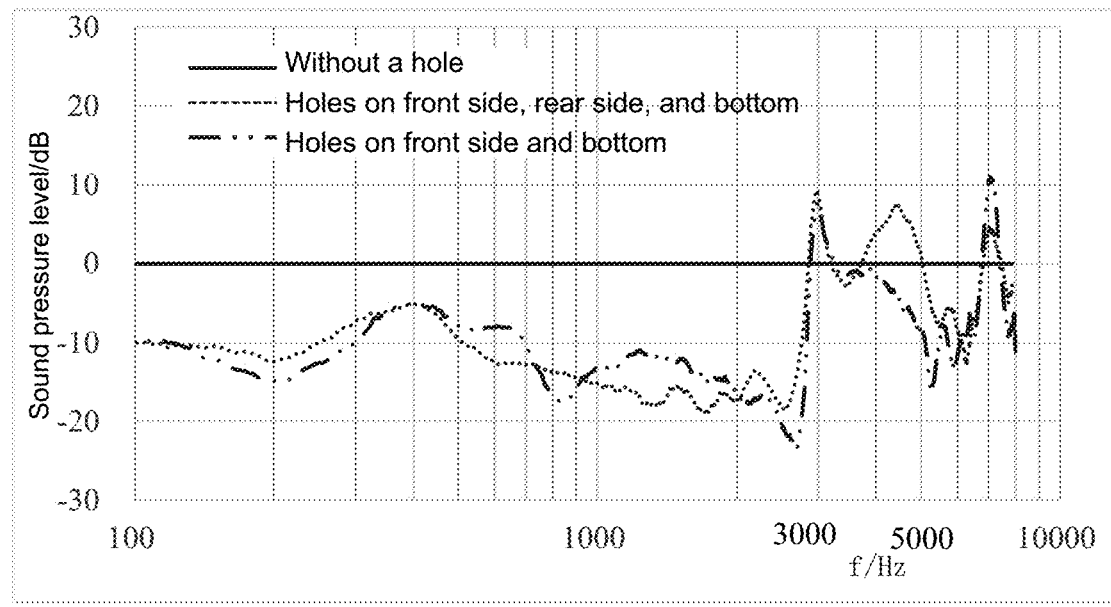
FIG. 10 illustrates frequency response curves of air-conducted sound leakage signals each of which is received by a sound transmitter with holes arranged at different positions of a first housing structure and a sound transmitter without a hole according to some embodiments of the present disclosure.

FIG. 10 illustrates frequency response curves of air-conducted sound leakage signals each of which is received by a sound transmitter with holes arranged at different positions of a first housing structure and a sound transmitter without a hole according to some embodiments of the present disclosure. The abscissa in FIG. 10 may represent frequencies of the air-conducted sound leakage signals received by the sound transmitter. The ordinate in FIG. 10 may represent the sound pressure levels of the air-conducted sound leakage signals at different frequencies. An ordinate value in FIG. 10 may be a relative value measured with the sound pressure level (the frequency response curve corresponding to "without a hole" shown in FIG. 10) of the air-conducted sound leakage signal received by the sound transmitter when the first housing structure is not configured with a hole as a reference value. As shown FIG. 10, in a specific frequency range (e.g., 100 Hz-3000 Hz), the sound pressure level (the frequency response curve corresponding to "holes on front side, rear side, and bottom" shown in FIG. 10) of the air-conducted sound leakage when holes are arranged on the front side of the housing, the rear side of the housing, and the bottom of the housing of the first housing structure and the sound pressure level (the frequency response curve corresponding to "holes on front side and bottom" shown in FIG. 10) of the air-conducted sound leakage when holes are arranged on the front side of the housing and the bottom of the housing of the first housing structure may be significantly reduced compared with the sound pressure level (the frequency response curve corresponding to "without a hole" shown in FIG. 10) of the air-conducted sound leakage when the first housing structure is not configured with a hole. In some embodiments, in a specific working frequency range (e.g., the human voice frequency range of 200 Hz-4000 Hz), the hearing aid device may effectively reduce the sound pressure level of the sound leakage signal received by the sound transmitter in the human voice frequency range by arranging holes on different side surfaces of the first housing structure of the vibration loudspeaker, thereby suppressing the howling of the hearing aid device. In addition, the air-conducted sound leakage may also improve the sound gain effect of the hearing aid device under the premise that the howling of the hearing aid device does not occur, thereby improving the maximum output volume of the hearing aid device to meet the needs of the user with more severely impaired hearing.

Referring to FIG. 10, in a specific frequency range (e.g., 3500 Hz-5000 Hz), the sound pressure level (the frequency response curve corresponding to "holes on a front side and rear side" shown in FIG. 9) of the air-conducted sound leakage when holes are arranged on the front side and the rear side of the housing of the first housing structure may be significantly reduced compared with the sound pressure level (the frequency response curve corresponding to "holes on front side, rear side, and bottom" shown in FIG. 9) of the air-conducted sound leakage when holes are arranged on the front side of the housing, the rear side of the housing, and the bottom of the housing of the first housing structure. It should be noted that, by arranging holes on the front side of the housing, the rear side of the housing, and the bottom of the housing of the first housing structure, and arranging holes on the front side of the housing and the rear side of the housing of the first housing structure, the sound pressure level of the air-conducted sound leakage signal received by the sound transmitter may be effectively reduced, thereby reducing the air-conducted sound leakage signal in the control signal (e.g., V2 in equation (1)), so that the difference between the air-conducted sound leakage signal received by the sound transmitter from the vibration loudspeaker and the original signal may not be larger than −33 dB, and the problem of howling may be avoided effectively.

The difference in the positions of the holes in the first housing structure of the vibration loudspeaker may affect the magnitude of the sound leakage signal received by the sound transmitter. In some embodiments, the holes may be arranged at the rear side of the housing and the bottom of the housing of the first housing structure of the vibration loudspeaker. For example, the holes may be arranged at the rear side of the housing and the front side of the housing of the first housing structure of the vibration loudspeaker. As another example, the holes may be arranged at the front side of the housing of the first housing structure of the vibration loudspeaker. As still another example, the holes may be arranged at the rear side of the housing, the front side of the housing, and the bottom of the housing of the first housing structure of the vibration loudspeaker. As still another example, the holes may be arranged at the bottom of the housing and the front side of the housing of the first housing structure of the vibration loudspeaker.

It should be noted that the positions of the holes in the first housing structure may not be limited to the front side of the housing, the rear side of the housing, and/or the bottom of the housing mentioned above. The holes may also be arranged on other side surfaces of the first housing structure. For example, the holes may also be arranged on other side surfaces such as an upper side of the first housing structure. It should also be noted that the positions of the holes shown in FIGS. 8, 9, and 10 in the first housing structure may be on the basis of the way the user wears the hearing aid device shown in FIG. 7 (the sound transmitter is arranged on the rear side of the auricle of the user and the vibration loudspeaker is arranged on the front side of the auricle of the user). In some embodiments, the way of wearing the hearing aid device may also be that the sound transmitter is arranged on the front side of the auricle of the user. The vibration loudspeaker may be arranged on the rear side of the auricle of the user. The position of the hole in the first housing structure may be adjusted adaptively according to relative positions of the vibration loudspeaker and the sound transmitter. In some embodiments, the way of wearing the hearing aid device may also be that the sound transmitter and the vibration loudspeaker are arranged on the same side of the auricle of the user (e.g., the front side or the rear side of the auricle of the user). The positions of the holes based on different wearing ways of the hearing aid device may be approximately the same as those described in FIG. 8, FIG. 9, and FIG. 10, which may not be repeated herein.

In some embodiments, the at least one hole of the hearing aid device may be configured with a mesh structure, and the mesh structure may cover the corresponding hole. The mesh structure may improve a waterproof and breathable performance of the hearing aid device. In some embodiments, the mesh structure may be a porous mesh structure, and the material of the porous mesh structure may have a certain acoustic impedance. In some embodiments, the sound leakage signal of the vibration loudspeaker may be reduced by adjusting the acoustic impedance of the mesh structure.

Figure 11:
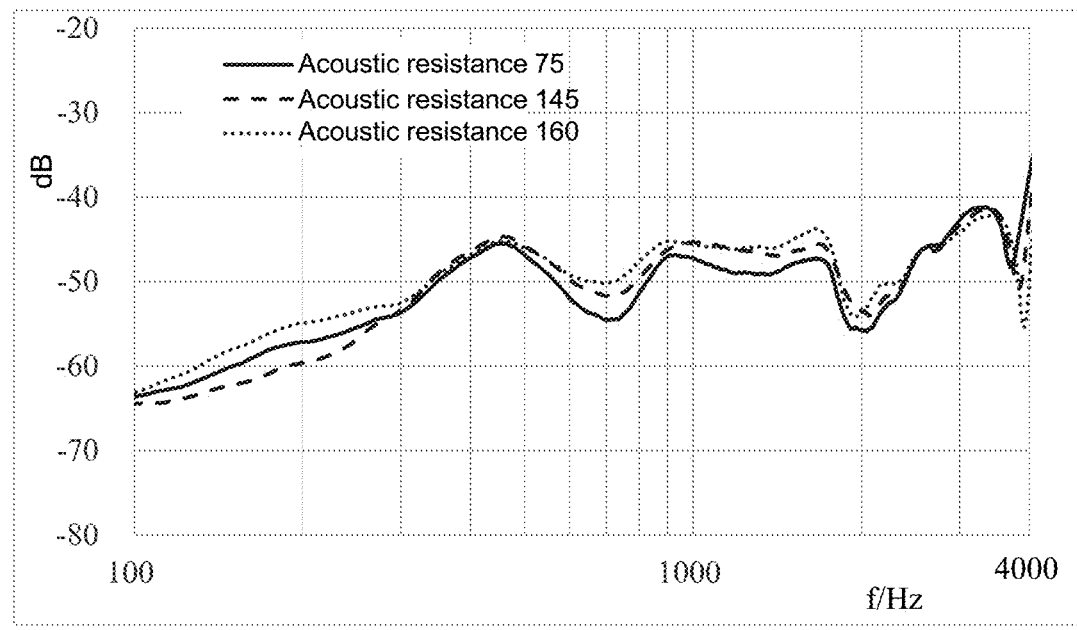
FIG. 11 illustrates curves each of which represents a difference between a sound leakage signal from a vibration loudspeaker including a mesh structure with different acoustic impedances and an original signal according to some embodiments of the present disclosure.

FIG. 11 illustrates curves each of which represents a difference between a sound leakage signal from a vibration loudspeaker including a mesh structure with different acoustic impedances and an original signal according to some embodiments of the present disclosure. The abscissa in FIG. 11 may represent frequencies of the air-conducted sound leakage signals. The ordinate in FIG. 11 may represent differences between the air-conducted sound leakage signals from the vibration loudspeaker and the original signal. The black solid line may represent a difference (indicated by "acoustic resistance 75" in FIG. 11) between the air-conducted sound leakage signal from the vibration loudspeaker for the mesh structure with an acoustic impedance of 75 MKS Rayls and the original signal, the black dashed line may represent a difference (indicated by "acoustic resistance 145" in FIG. 11) between the air-conducted sound leakage signal from the vibration loudspeaker for the mesh structure with an acoustic impedance of 145 MKS Rayls and the original signal, and the black dotted line may represent a difference (indicated by "acoustic resistance 160" in FIG. 11) between the air-conducted sound leakage signal from the vibration loudspeaker for the mesh structure with an acoustic impedance of 160 MKS Rayls and the original signal. It may be seen from FIG. 11 that in a frequency range of 100 Hz-4000 Hz, the air-conducted sound leakage signal from the vibration loudspeaker for the mesh structure with three different acoustic impedances and the sound pressure level of the original signal may be 160 MKS Rayls, 145 MKS Rayls, and 75 MKS Rayls, respectively. It may be understood that in the frequency range of 100 Hz-4000 Hz, the larger the acoustic impedance of the mesh structure, the larger the difference between the air-conducted sound leakage signal from the vibration loudspeaker and the original signal. By arranging the mesh structure, the sound pressure level of the air-conducted sound leakage signal received by the sound transmitter may be further reduced, so that the difference between the air-conducted sound leakage signal received by the sound transmitter from the vibration loudspeaker and the control signal may not be larger than −33 dB, thereby avoiding the howling effectively.

In some embodiments, on the basis of meeting the waterproof and dustproof requirements of the hearing aid device, the mesh structure with a smaller acoustic impedance may be selected to reduce the sound leakage signal generated by the vibration loudspeaker. For example, the acoustic impedance of the mesh structure may be no more than 260 MKS Rayls. As another example, the acoustic impedance of the mesh structure may be no more than 160 MKS Rayls. As still another example, the acoustic impedance of the mesh structure may be no more than 145 MKS Rayls. As still another example, the acoustic impedance of the mesh structure may be no more than 75 MKS Rayls. In some embodiments, the material of the mesh structure may be one or more of metal materials and polymer materials. In some embodiments, the metal material may include copper, zinc, aluminum, iron, molybdenum, chromium, manganese, copper, or the like, or any combination thereof. In some embodiments, the polymer material may include isobutyl, acrylate, polysulfide, nitrile, silicone rubber, polyurethane, polyvinyl chloride, epoxy, or the like, or any combination thereof.

Figure 12:
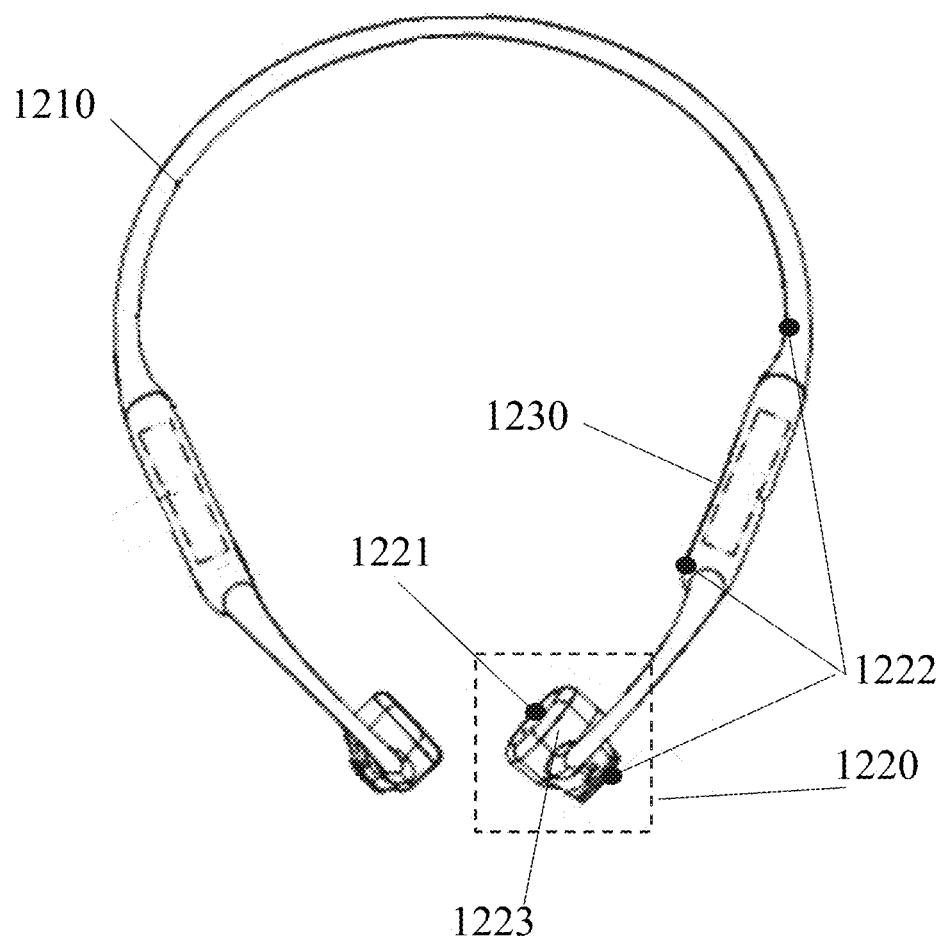
FIG. 12 is a structural diagram of an exemplary rear-hanging hearing aid device according to some embodiments of the present disclosure.

FIG. 12 is a structural diagram of an exemplary rear-hanging hearing aid device according to some embodiments of the present disclosure. The rear-hanging hearing aid device as shown in FIG. 12 may include a rear-hanging structure 1210 and a hearing aid device 1220. The hearing aid device 1220 may include a sound transmitter 1222, a vibration loudspeaker 1221, and a housing structure 1223. The rear-hanging structure 1210 may be configured to be worn on the head or neck of the user. The rear-hanging structure 1210 may have two ends. When the user wears the rear-hanging structure 1210, two ends of the rear-hanging structure 1210 may be located near the auricle of the user. In some embodiments, the hearing aid device 1220 may be arranged at one end of the rear-hanging structure 1210. When the user wears the rear-hanging hearing aid device, the hearing aid device 1220 may be located near the auricle of the user. As another example, the hearing aid device 1220 may also be arranged at two ends of the rear-hanging structure 1210. When the user wears the rear-hanging hearing aid device, the hearing aid devices 1220 at the two ends of the rear-hanging structure 1210 may be located near the left auricle and the right auricle, respectively. In some embodiments, the hearing aid device 1220 may be fixedly connected to the rear-hanging structure 1210. The fixed connection may refer to a connection manner such as bonding, riveting, integral formation, or the like. In some embodiments, the hearing aid device 1220 may also be detachably connected to the rear-hanging structure 1210. The detachable connection may refer to a connection manner such as a snap connection, a threaded connection, or the like.

Refer to FIG. 12, the sound transmitter 1222 and the vibration loudspeaker 1221 may be fixed in the housing structure 1223. When the user wears the rear-hanging hearing aid device, the sound transmitter 1222 and the vibration loudspeaker 1221 may be located on the front side of the auricle of the user at the same time. When the user wears the rear-hanging hearing aid device, the rear-hanging structure 1210 may surround or partially surround a specific part of the body of the user (e.g., head, neck, etc.). The rear-hanging structure 1210 may have a certain pressure on a specific part of the human body (e.g., head, neck, etc.), so that the rear-hanging hearing aid device may keep contact with the user and avoid falling during wearing. In some embodiments, the rear-hanging hearing aid device may further include a core housing 1230 for accommodating a power module and a control module. The core housing 1230 may be a part of the rear-hanging structure 1210 or an independent structure relative to the rear-hanging structure 1210.

In some embodiments, by changing the shape and/or the position of the housing structure 1223, the sound transmitter 1222 may be arranged on the rear side of the auricle of the user, and the vibration loudspeaker 1221 may be arranged on the front side of the auricle of the user. For example, the housing structure 1223 may surround the auricle of the user. The housing structure 1223 may be hung on the auricle of the user. The sound transmitter 1222 may be arranged at an end of the housing structure 1223 contacting the rear side of the auricle of the user, and the other end of the housing structure 1223 contacting the front side of the auricle of the user may be configured with the vibration loudspeaker 1221. It may be realized that the sound transmitter 1222 may be arranged on the rear side of the auricle of the user when the user wears the rear-hanging hearing aid device. The vibration loudspeaker 1221 may be arranged on the front side of the auricle of the user. It should be noted that the positions of the sound transmitter 1222 and the vibration loudspeaker 1221 may be exchanged. That is, the sound transmitter 1222 may be arranged on the front side of the auricle of the user, and the vibration loudspeaker 1221 may be arranged on the rear side of the auricle of the user. In some embodiments, the sound transmitter 1222 may not be arranged at the housing structure 1223. For example, the sound transmitter 1222 may also be arranged at the core housing 1230 and/or the rear-hanging structure 1210. As another example, when there is a plurality of sound transmitters, the sound transmitters may also be arranged at the housing structure 1223, the core housing 1230, and/or the rear-hanging structure 1210 at the same time.

Figure 13:
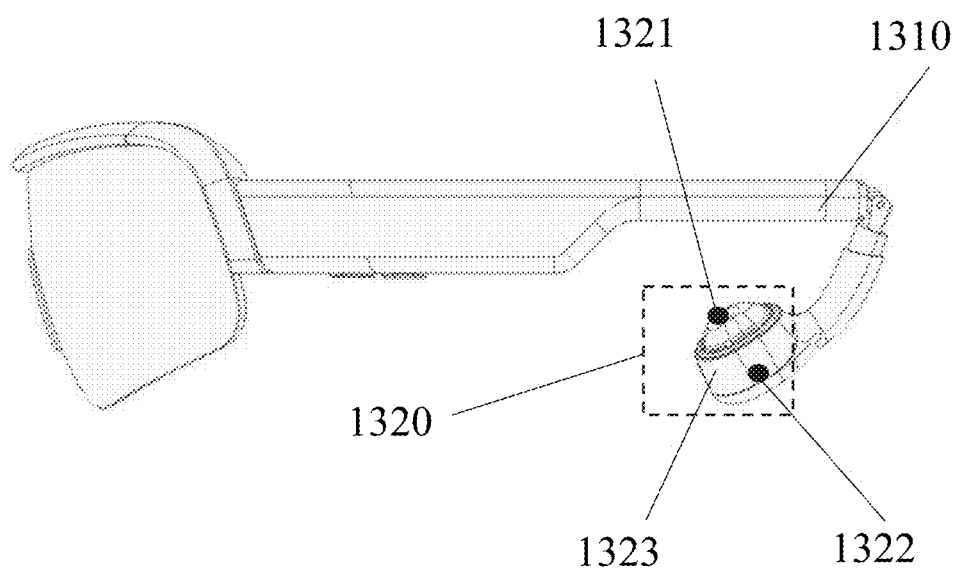
FIG. 13 is a structural diagram of an exemplary glasses-type hearing aid device according to some embodiments of the present disclosure.

FIG. 13 is a structural diagram of an exemplary glasses-type hearing aid device according to some embodiments of the present disclosure. The glasses-type hearing aid device as shown in FIG. 13 may include temples 1310 and a hearing aid device 1320. The hearing aid device 1320 may include a sound transmitter 1322, a vibration loudspeaker 1321, and a housing structure 1323. In some embodiments, the hearing aid device 1320 may be fixedly connected to the temple 1310. The fixed connection may refer to a connection manner such as bonding, riveting, integral formation, or the like. In some embodiments, the hearing aid device 1320 may also be detachably connected to the temple 1310. The detachable connection may refer to a connection manner such as a snap connection, a threaded connection, or the like.

Refer to FIG. 13, the sound transmitter 1322 and the vibration loudspeaker 1321 may be fixed in the housing structure 1323. When the user wears the glasses-type hearing aid device, the sound transmitter 1322 and the vibration loudspeaker 1321 may be located on the front side of the auricle of the user at the same time. When the user wears the glasses-type hearing aid device, the temples 1310 may surround the auricle of the user. The temples 1310 may have a certain pressure on the head of the user, so that the glasses-type hearing aid device may keep contact with the user and avoid falling during wearing.

In some embodiments, the shape and/or the position of the housing structure 1323 may be changed so that the sound transmitter 1322 may be arranged on the rear side of the auricle of the user and the vibration loudspeaker 1321 may be arranged on the front side of the auricle of the user. For example, the housing structure 1323 may surround the auricle of the user. The housing structure 1323 may be hung on the auricle of the user. One end of the housing structure 1323 contacting the rear side of the auricle of the user may be configured with the sound transmitter 1322, and the other end of the housing structure 1323 contacting the front side of the auricle of the user may be configured with the vibration loudspeaker 1321. When the user wears the glasses-type hearing aid device, the sound transmitter 1322 may be located on the rear side of the auricle of the user, and the vibration loudspeaker 1321 may be located on the front side of the auricle of the user. It should be noted that the positions of the sound transmitter 1322 and the vibration loudspeaker 1321 in the embodiment may be exchanged. That is, the sound transmitter 1322 may be arranged on the front side of the auricle of the user, and the vibration loudspeaker 1321 may be arranged on the rear side of the auricle of the user. In some embodiments, the sound transmitter may not be arranged on the housing structure 1323. For example, the sound transmitter may also be arranged at the temple 1310. As another example, when there is a plurality of sound transmitters, the sound transmitters may also be arranged on the housing structure 1323 and the temple 1310 at the same time.

Figure 14:
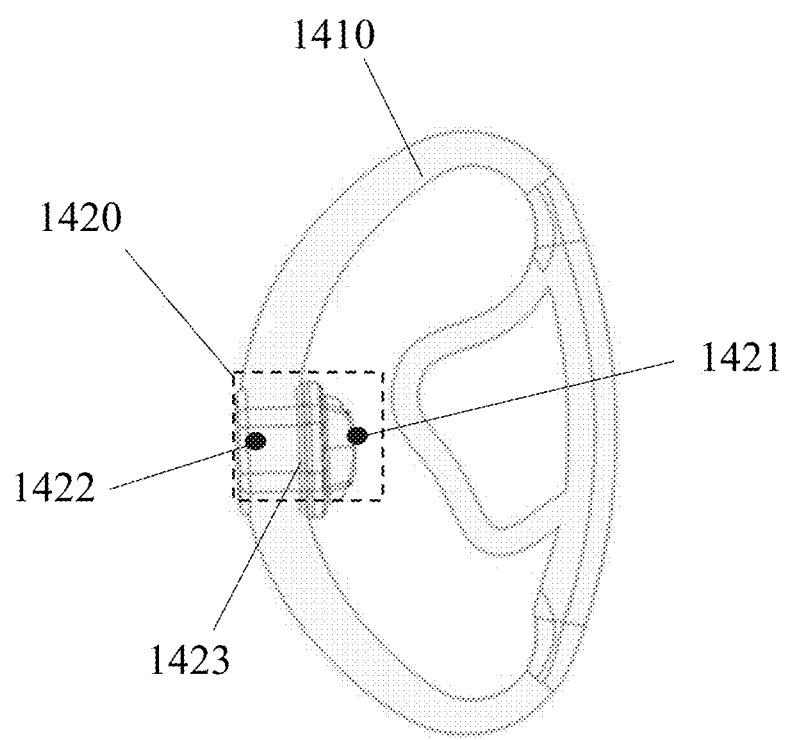
FIG. 14 is a structural diagram of an exemplary wireless hearing aid device according to some embodiments of the present disclosure.

FIG. 14 is a structural diagram of an exemplary wireless hearing aid device according to some embodiments of the present disclosure. The wireless hearing aid device as shown in FIG. 14 may include an ear hook structure 1410 and a hearing aid device 1420. The hearing aid device 1420 may include a sound transmitter 1422, a vibration loudspeaker 1421, and a housing structure 1423. In some embodiments, the hearing aid device 1420 may be fixedly connected to the ear hook structure 1410. The fixed connection may refer to a connection manner such as bonding, riveting, integral formation, or the like. In some embodiments, the hearing aid device 1420 may also be detachably connected to the ear hook structure 1410. The detachable connection may refer to a connection manner such as a snap connection, a threaded connection, or the like.

Refer to FIG. 14, the sound transmitter 1422 and the vibration loudspeaker 1421 may be fixed in the housing structure 1423. When the user wears the wireless hearing aid device, the sound transmitter 1422 and the vibration loudspeaker 1421 may be arranged on the front side of the auricle of the user at the same time. When the user wears the wireless hearing aid device, the ear hook structure 1410 may surround a peripheral side of the auricle of the user. The ear hook structure 1410 may have a certain pressure on a specific part of the human body (e.g., ear), so that the wireless hearing aid device may keep contact with the user and avoid falling during wearing.

In some embodiments, the shape and/or the position of the housing structure 1423 may be changed so that the sound transmitter 1422 may be arranged on the rear side of the auricle of the user and the vibration loudspeaker 1421 may be arranged on the front side of the auricle of the user. For example, the housing structure 1423 may be designed as a structure that clamps the auricle of the user, and the clamp-type housing structure may include two clip structures. When the clamp-type housing structure is clamped on the ears of the user, the two clip structures may be arranged on the front side and the rear side of the auricle of the user, respectively. The sound transmitter 1422 may be arranged in the clip structure on the rear side of the auricle of the user. The vibration loudspeaker 1421 may be arranged in the clip structure on the front side of the auricle of the user. When the user wears the wireless hearing aid device, the sound transmitter 1422 may be arranged on the rear side of the auricle of the user, and the vibration loudspeaker 1421 may be arranged on the front side of the auricle of the user. It should be noted that the positions of the sound transmitter 1422 and the vibration loudspeaker 1421 may be exchanged. That is, the sound transmitter 1422 may be arranged on the front side of the auricle of the user, and the vibration loudspeaker 1421 may be arranged on the rear side of the auricle of the user. In some embodiments, the sound transmitter may not be arranged on the housing structure 1423. For example, the sound transmitter may also be arranged on the ear hook structure 1410. As another example, when there is a plurality of sound transmitters, the sound transmitters may also be arranged on the housing structure 1423 and the ear hook structure 1410 at the same time.

The basic concepts have been described. Obviously, for those skilled in the art, the detailed disclosure may be only an example and does not constitute a limitation to the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment", "an embodiment", and/or "some embodiments" mean a certain feature, structure, or characteristic related to at least one embodiment of the present disclosure. Therefore, it should be emphasized and noted that "an embodiment", "one embodiment", or "an alternative embodiment" mentioned twice or more in different positions in the present disclosure does not necessarily refer to the same embodiment. In addition, some features, structures, or features in the present disclosure of one or more embodiments may be appropriately combined.

In addition, those skilled in the art may understand that various aspects of the present disclosure may be illustrated and described through several patentable categories or situations, including any new and useful processes, machines, products, or combinations of materials, or any new and useful improvements. Accordingly, all aspects of the present disclosure may be performed entirely by hardware, may be performed entirely by softwares (including firmware, resident softwares, microcode, etc.), or may be performed by a combination of hardware and softwares. The above hardware or softwares can be referred to as "data block", "module", "engine", "unit", "component" or "system". In addition, aspects of the present disclosure may appear as a computer product located in one or more computer-readable media, the product including computer-readable program code.

A computer storage medium may be any computer-readable medium other than a computer-readable storage medium, which may be connected to an instruction execution system, device, or device to enable communication, propagation, or transmission of a program for use. The propagation signal may have multiple manifestations, including electromagnetic form, optical form, etc., or a suitable combination form. The computer storage medium may be any computer-readable medium other than the computer-readable storage medium, which may perform system, devices, or devices to implement a system, devices, or devices to implement communication, propagating, or devices, by connecting to an instruction. The program code located on a computer storage medium may be transmitted through any suitable medium, including radio, cable, fiber optic cable, RF, or similar media, or any combination of the media.

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "approximately", "approximately" or "substantially" indicate that the number is allowed to vary by ±20% Accordingly, in some embodiments, the numerical parameters used in the specification and claims are approximate values, and the approximation may change according to the characteristics required by the individual embodiments. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each patent, patent application, patent application publication, and other materials cited herein, such as articles, books, instructions, publications, documents, etc., are hereby incorporated by reference in their entirety. Application history documents that are inconsistent or conflicting with the contents of the present disclosure are excluded, and documents (currently or later attached to the present disclosure) that limit the widest range of the scope of the present disclosure are also excluded. It should be noted that if the description, definition, and/or terms used in the appended application of the present disclosure are inconsistent or conflicting with the content described in the present disclosure, the use of the description, definition, and/or terms of the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A hearing aid device, comprising:
a signal processing circuit configured to generate a control signal; and
at least one vibration loudspeaker configured to convert the control signal into a vibration signal, wherein the control signal includes an original signal and an air-conducted sound leakage signal, the air-conducted sound leakage signal is generated from the at least one vibration loudspeaker, and a value of the air-conducted sound leakage signal is different from a value of the original signal.

2. The hearing aid device of claim 1, further comprising:
at least one sound transmitter configured to collect a sound signal and the air-conducted sound leakage signal, and convert the collected signal into an electrical signal, wherein the control signal is generated by processing the electrical signal.

3. The hearing aid device of claim 2, further comprising:
a housing structure configured to accommodate at least one of: the at least one sound transmitter, the signal processing circuit, or the at least one vibration loudspeaker.

4. The hearing aid device of claim 1, wherein a difference between the air-conducted sound leakage signal and the original signal is not larger than −33 dB.

5. The hearing aid device of claim 1, wherein in a frequency range of 100 Hz-2000 Hz, a difference between the air-conducted sound leakage signal and the original signal is not larger than −40 dB.

6. The hearing aid device of claim 1, wherein in a frequency range of 2000 Hz-8000 Hz, a difference between the air-conducted sound leakage signal and the original signal is not larger than −33 dB.

7. The hearing aid device of claim 2, wherein a distance between any one of the at least one sound transmitter and any one of the at least one vibration loudspeaker is not less than 7 mm.

8. The hearing aid device of claim 2, wherein the at least one sound transmitter and the at least one vibration loudspeaker are arranged on a same side of an auricle of a user.

9. The hearing aid device of claim 2, wherein the at least one sound transmitter and the at least one vibration loudspeaker are arranged on a different sides of an auricle of a user.

10. The hearing aid device of claim 3, wherein a baffle structure is arranged between the at least one sound transmitter and the at least one vibration loudspeaker, and the baffle structure is connected to the housing structure.

11. The hearing aid device of claim 3, wherein the at least one vibration loudspeaker includes a first housing structure connected to the housing structure.

12. The hearing aid device of claim 11, wherein the first housing structure includes at least one hole, and the at least one hole is in communication with an inside of the first housing structure.

13. The hearing aid device of claim 12, wherein the at least one hole is arranged on a bottom side wall of the first housing structure of the at least one vibration loudspeaker, the bottom side wall facing the at least one sound transmitter and the at least one vibration loudspeaker.

14. The hearing aid device of claim 12, wherein the at least one hole is arranged on a side wall of the first housing structure of the at least one vibration loudspeaker, the side wall facing away from the at least one sound transmitter.

15. The hearing aid device of claim 14, wherein the at least one hole is arranged on a bottom side wall of the first housing structure of the at least one vibration loudspeaker.

16. The hearing aid device of claim 15, wherein the at least one hole is arranged on a side wall of the first housing structure of the at least one vibration loudspeaker, the side wall facing the at least one sound transmitter.

17. The hearing aid device of claim 12, wherein a mesh structure is arranged on the at least one hole, and the mesh structure covers the at least one hole.

18. The hearing aid device of claim 17, wherein an acoustic impedance of the mesh structure is not larger than 260 MKS Rayls.

19. The hearing aid device of claim 1, further comprising a power amplifier, wherein the power amplifier is configured to amplify an amplitude of the control signal.

20. The hearing aid device of claim 1, wherein a vibration loudspeaker of the at least one vibration loudspeaker includes:

a vibration component, wherein the vibration component is electrically connected to the signal processing circuit and is configured to receive the control signal and generate bone-conducted sound waves based on the control signal.

* * * * *